United States Patent
Kinoshita et al.

(10) Patent No.: US 8,929,563 B2
(45) Date of Patent: Jan. 6, 2015

(54) WIRELESS POWER TRANSMISSION AUDIO SYSTEM AND DEVICE ON TRANSMITTING END AND LOUDSPEAKER FOR USE IN SUCH A SYSTEM

(75) Inventors: Keisuke Kinoshita, Kyoto (JP); Junichi Kawamura, Osaka (JP); Shutai Okamura, Cupertino, CA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 294 days.

(21) Appl. No.: 13/329,457

(22) Filed: Dec. 19, 2011

(65) Prior Publication Data
US 2012/0163619 A1 Jun. 28, 2012

(30) Foreign Application Priority Data

Dec. 22, 2010 (JP) .................................. 2010-285497
Nov. 8, 2011 (JP) .................................. 2011-244726

(51) Int. Cl.
*H04B 5/00* (2006.01)
*H02J 17/00* (2006.01)
*H04L 25/49* (2006.01)

(52) U.S. Cl.
CPC .............. *H02J 17/00* (2013.01); *H04R 2420/07* (2013.01); *H04L 25/4902* (2013.01)
USPC ............ 381/79; 381/323; 381/332; 455/41.1; 455/571

(58) Field of Classification Search
USPC ........... 381/77, 78, 79, 82, 85, 332, 334, 315, 381/311, 303, 307, 300, 323; 455/39, 41.1, 455/41.2, 41.3, 573, 575.2, 571; 367/180, 367/181, 182, 185, 189; 700/94
See application file for complete search history.

(56) References Cited

U.S. PATENT DOCUMENTS

| | | | |
|---|---|---|---|
| 2005/0285718 A1* | 12/2005 | Enguent ....................... | 340/10.1 |
| 2010/0081379 A1* | 4/2010 | Cooper et al. ............... | 455/41.1 |
| 2010/0141042 A1 | 6/2010 | Kesler et al. | |
| 2010/0181961 A1 | 7/2010 | Novak et al. | |

FOREIGN PATENT DOCUMENTS

| | | |
|---|---|---|
| JP | 2004-336513 A | 11/2004 |
| JP | 2007-049437 A | 2/2007 |
| JP | 2009-153056 A | 7/2009 |

* cited by examiner

*Primary Examiner* — Leshui Zhang
(74) *Attorney, Agent, or Firm* — Renner, Otto, Boisselle & Sklar, LLP

(57) ABSTRACT

The transmitter of a wireless power transmission audio system includes: a transmission signal generating section for generating a transmission signal comprised of an RF signal; a first resonant circuit which receives and sends out the transmission signal; a detecting section for sensing a variation in the transmission signal; and a transmission signal adjusting section. The loudspeaker of the system includes: a second resonant circuit for receiving the transmission signal by producing a magnetic field resonant coupling phenomenon; and an audio output section for reproducing the audio signal. At least one of the transmitter and the loudspeaker includes an impedance adjusting section which changes an impedance value on the transmission line of the transmission signal. When the impedance adjusting section changes the impedance value, the transmission signal adjusting section changes the signal waveform of the transmission signal.

14 Claims, 19 Drawing Sheets

Prior Art

CHANGE OF IMPEDANCE
(VARIATION IN TRANSFER EFFICIENCY)

CHANGE OF IMPEDANCE

WIRELESS POWER TRANSMISSION AUDIO SYSTEM AND DEVICE ON TRANSMITTING END AND LOUDSPEAKER FOR USE IN SUCH A SYSTEM

BACKGROUND OF THE INVENTION

1. Field of the Invention

The present invention relates to a wireless power transmission audio system for transmitting wirelessly an audio signal and electric power that drives a loudspeaker and also relates to a device on the transmitting end and a loudspeaker for use in such a system.

2. Description of the Related Art

Recently, as cellphones, terrestrial digital TV broadcasting and their related technologies have been further advanced, wireless receivers that receive text data, audio data and telecasts wirelessly as radio waves without using a cable connection have become more and more popular. Currently, electric power is still supplied through a cable to most of those wireless receivers in order to charge its built-in battery to the point that the device is ready to use. However, as those wireless telecommunications technologies have been developing, a lot of people have been attempting nowadays to transmit electric power, as well as those data signals, wirelessly, too.

For example, wireless power transmission technologies by electromagnetic induction have already been applied to various consumer electronic products such as electric shavers and motorized tooth brushes, and have increased their handiness for general consumers successfully. Meanwhile, techniques for transmitting electric power and signals at the same time have also been developed. For example, Japanese Patent Application Laid-Open Publication No. 2004-336513 (which will be referred to herein as "Patent Document No. 1" for convenience sake) discloses a wireless power transmission scheme for a loudspeaker that adopts the electromagnetic induction method.

Patent Document No. 1 discloses a scheme for transmitting not only electric power but also an audio signal from the power transmitting end to the power receiving end via electromagnetic induction. Specifically, as shown in FIG. 18, a transmitting coil 911 for a transmitter 901 (which may be an audio device) and a receiving coil 912 for a receiver 2 (which may be a loudspeaker) are arranged to face each other with a bathroom wall 99 interposed between them. In such an arrangement, those coils are electromagnetically coupled together through the wall 99 and electric power and an audio signal are transmitted wirelessly to the loudspeaker 902. With such an arrangement, only the loudspeaker 902 may be put in the bathroom with the audio device itself such as a CD player left outside of the bathroom. Consequently, it is possible to avoid an unwanted situation where condensation produced in the audio device such as a CD player prevents the CD player from retrieving the audio signal requested.

According to Patent Document No. 1, the transmitting coil 911 and the receiving coil 912 are fixed on two opposite sides of the wall, and the distance between those coils is constant. In other words, the distance between the device 901 and the loudspeaker 902 is constant. However, when electric power and an audio signal are transmitted wirelessly to a loudspeaker, the distance from the audio device to the loudspeaker is not always constant but the position of the loudspeaker may need to be changed arbitrarily in some system. In that case, the distance from the audio device to the loudspeaker varies according to how the user will use that system. If such a wireless power transmission method by electromagnetic induction is adopted, it is difficult to set the distance between the transmitting and receiving coils 911 and 912 to be long enough. This is because according to the electromagnetic induction method, the longer the coil-to-coil distance, the more significantly the power transfer efficiency would decrease. For that reason, such a wireless power transmission system is supposed to be used with the coils always arranged close to each other, and therefore, is hard to cope with a situation where the coil-to-coil distance varies.

Wireless power transmission is not always carried out by such an electromagnetic induction method but may also be done by magnetic resonance method. And devices that uses the latter method have been developed in increasing numbers lately. According to the magnetic resonance method, a capacitor is connected in series or in parallel to each of a transmitting coil and a receiving coil to form two resonant circuits, and electric power is transmitted between those two resonant circuits via a magnetic field. With such a technique adopted, power can be transmitted between two devices that are arranged at even more distant locations. Thus, people hope that such a technique will be applicable to the audio system described above.

To always achieve high transfer efficiency by the magnetic resonance method, the impedance of the transmitter (i.e., on the power supply side) as viewed from the resonant circuit on the transmitting end and the impedance of the receiver (i.e., on the load side) as viewed from the resonant circuit on the receiving end should be controlled appropriately. Suppose a capacitor is connected in series to each of the transmitting and receiving coils 911 and 912 to make each of those coils operate as a resonator. In that case, if the impedance value is maintained at a constant value A as shown in FIG. 19B, then a maximum transfer efficiency B is achieved at a particular distance x as shown in FIG. 19A. That is why it is not true that the shorter the distance between the transmitting and receiving coils 911 and 912, the higher the transfer efficiency.

Unless the impedance values are controlled, the transfer efficiency will decrease even if the distance is shorter than x as shown in FIG. 19A. That is why to achieve high transfer efficiency in a situation where the coil-to-coil distance has varied, the impedance of the transmitter as viewed from the resonant circuit on the transmitting end and that of the receiver as viewed from the resonant circuit on the receiving end need to be controlled appropriately. The same can be said even when power should be transmitted wirelessly to the loudspeaker. That is to say, to maintain high power transfer efficiency, it is important to vary the impedances according to the distance between the transmitting and receiving coils 911 and 912.

FIGS. 20A and 20B show how the transfer efficiency changes with the distance between the transmitting and receiving coils if the impedance of the transmitter as viewed from the resonant circuit on the transmitting end and that of the receiver as viewed from the resonant circuit on the receiving end are controlled appropriately. As shown in FIG. 20B, if the impedances on both of the transmitting and receiving ends are controlled, the shorter the distance, the larger the best impedance value z tends to be as indicated by the solid circles. That is why by controlling the impedance according to the distance so that the impedance becomes as close to the best value as possible, even if the distance is not x, the transfer efficiency can also be kept higher as indicated by the solid circles in FIG. 20A than in a situation where the impedance is not controlled but fixed as indicated by the open circles. Furthermore, as indicated by the solid triangles in FIGS. 20A and 20B, even by controlling the impedance on only one of the two sides (e.g., on the transmitting end in the example illustrated in FIGS. 20A and 20B), it is also possible to prevent the transfer efficiency from decreasing. As can be seen from these results, to achieve high transfer efficiency even when the distance varies, it is important to carry out impedance control (i.e., impedance matching).

If impedances are controlled, the impedances should be controlled continuously according to the distance using a variable inductor and a variable capacitor in order to maintain as high transfer efficiency as possible. Nevertheless, a circuit for changing the impedance continuously usually has a large circuit size and requires a complicated control. That is why to overcome such problems, instead of performing such a continuous control, circuit elements (such as capacitors and inductors) with mutually different fixed impedances and multiple switches may be provided. And if the distance has varied to a certain degree between the resonant circuits, the impedances may be changed stepwise by turning the switches. In this manner, the control can get done relatively easily with high enough transfer efficiency maintained.

If an audio device and a loudspeaker need to be connected together wirelessly by the magnetic resonance method, one of the following two methods can be taken. According to one of the two methods, electric power is transferred between the two coils by the magnetic resonance method, an audio signal is transmitted and received wirelessly over a wireless LAN, for example, and the electric power is received at the loudspeaker end and used to drive the circuits, thereby reproducing the audio signal received.

The other method is transmitting wirelessly both the electric power to drive the loudspeaker and the audio signal between the coils at the same time by the magnetic resonance method. According to such a method, the electric power to drive the loudspeaker is transmitted wirelessly between the resonant circuits on the transmitting and receiving ends by using a frequency signal (a periodical signal), of which the frequency is adjusted to the resonant frequency of the resonant circuits, and the frequency signal is subjected to either AM or FM modulation according to the audio signal and then transmitted to the loudspeaker. Such a technique is disclosed in Japanese Patent Application Laid-Open Publication No. 2009-153056 (which will be referred to herein as "Patent Document No. 2" for convenience sake), for example. In such an arrangement, the circuits on the loudspeaker end may all be passive circuits, and the drive power can be supplied to the loudspeaker and the audio signal can be read by demodulating the AM/FM modulated signal.

Meanwhile, Japanese Patent Application Laid-Open Publication No. 2007-49437 (which will be referred to herein as "Patent Document No. 3" for convenience sake) discloses a method for transmitting both electric power and an audio signal to a loudspeaker at the same time not by the wireless power transmission method but through a cable by superposing a PWM modulated signal, representing the audio signal, on a DC power signal. According to this technique, the PWM modulated audio signal is superposed on the output of a power supply circuit and transmitted to the loudspeaker, and then demodulated on the loudspeaker end, thereby reproducing an audio signal that has the electric power to drive the loudspeaker. If the volume needs to be adjusted, the amplitude and the pulse width of the PWM signal just need to be changed on the transmitting end.

In transmitting electric power and an audio signal at the same time by the magnetic resonance method, however, if the distance between the audio device itself and the loudspeaker changes, the audio signal could not be obtained as intended. The present inventors confirmed via experiments that particularly when the transfer efficiency was increased by controlling the impedances as described above, the audio signal thus obtained often had problems.

It is therefore an object of the present invention to provide an audio system that can transmit electric power and an audio signal to a loudspeaker wirelessly by electromagnetic resonance method and that can read the audio signal with high fidelity. Another object of the present invention is to provide a device on the transmitting end and a loudspeaker for such an audio system.

SUMMARY OF THE INVENTION

A wireless power transmission audio system according to the present invention includes a device on the transmitting end and a loudspeaker, which is associated with the device on the transmitting end, and is configured to transmit electric power and an audio signal wirelessly from the device on the transmitting end to the loudspeaker. The device on the transmitting end includes: a transmission signal generating section for generating a transmission signal, which is comprised of an RF signal for use to transmit the electric power and the audio signal; a first resonant circuit, which receives and sends out the transmission signal and of which the resonant frequency is equal to the frequency of the RF signal; a detecting section for sensing a variation in the transmission signal; and a transmission signal adjusting section for controlling the signal waveform of the transmission signal. The loudspeaker includes: a second resonant circuit, which receives at least a part of the transmission signal that has been sent out by the first resonant circuit by producing either a magnetic resonant coupling phenomenon or an electric field resonant coupling phenomenon at the resonant frequency; and an audio output section for reproducing the audio signal in accordance with a signal supplied from the second resonant circuit. At least one of the device on the transmitting end and the loudspeaker includes an impedance adjusting section, which is connected to its associated first or second resonant circuit and which changes an impedance value on the transmission line of the transmission signal according to the variation of the transmission signal that has been sensed by the detecting section. When the impedance adjusting section changes the impedance value, the transmission signal adjusting section changes the signal waveform of the transmission signal at the device on the transmitting end.

In one preferred embodiment, the transmission signal generating section includes a PWM signal generating section for generating a pulse-width-modulated audio signal, and the transmission signal is obtained by multiplying the pulse-width-modulated audio signal and the RF signal together.

In this particular preferred embodiment, the transmission signal adjusting section includes an amplitude control section for controlling the amplitude of the pulse-width-modulated audio signal.

In another preferred embodiment, the transmission signal adjusting section includes a pulse width control section for controlling the pulse width of the pulse-width-modulated audio signal.

In still another preferred embodiment, the detecting section senses a variation to be caused in the transmission signal depending on the relative positions of the first and second resonant circuits. In accordance with a signal supplied from the detecting section, the impedance adjusting section controls the impedance value and the transmission signal adjusting section controls the signal waveform of the transmission signal.

In this particular preferred embodiment, by sensing a variation in the waveform of the transmission signal at the first resonant circuit, the detecting section determines the relative positions of the first and second resonant circuits.

In another preferred embodiment, by sensing a variation in the waveform of the transmission signal at the transmission signal generating section, the detecting section determines the relative positions of the first and second resonant circuits.

In still another preferred embodiment, in accordance with the output of the detecting section, the impedance adjusting section changes the impedance value discretely and the transmission signal adjusting section changes the signal waveform of the transmission signal stepwise.

In yet another preferred embodiment, in a no-signal interval between pulses of the transmission signal, which is defined by the pulse-width-modulated audio signal, the impedance adjusting section changes the impedance value.

In yet another preferred embodiment, the audio system further includes a control section, which outputs a control signal to the impedance adjusting section and the transmission signal adjusting section in accordance with a signal supplied from the detecting section. The control section includes a storage section, which stores the relative positions that have been detected by the detecting section and also stores information about how transfer efficiency between the first and second resonant circuits changes with the impedance value that has been set by the impedance adjusting section. The control section performs a control so that the product of the amplitude and the pulse width of the pulse-width-modulated signal remains the same before and after the impedance value has been changed by the impedance adjusting section, thereby keeping the volume of the audio output through the audio output section unchanged.

In yet another preferred embodiment, the loudspeaker includes the impedance adjusting section. The device on the transmitting end further includes a control signal transmitting circuit for sending a control signal to the loudspeaker's impedance adjusting section. The loudspeaker's impedance adjusting section changes the impedance value in accordance with the control signal.

In yet another preferred embodiment, each of the device on the transmitting end and the loudspeaker has its own impedance adjusting section.

In yet another preferred embodiment, the loudspeaker includes: an envelope detecting section for detecting the envelope of a signal that has been received by the second resonant circuit; a low-pass filter circuit for retrieving the audio signal based on the output of the envelope detecting section; and an audio converting section for reproducing the audio based on the output of the low-pass filter circuit.

A device on the transmitting end according to the present invention is used in an audio system according to any of the preferred embodiments of the present invention described above.

A loudspeaker according to the present invention is used in an audio system according to any of the preferred embodiments of the present invention described above.

According to the present invention, if the impedance is changed in order to maintain the same transfer efficiency even when the distance between the audio device (an exemplary device on the transmitting end) itself and the loudspeaker changes, the waveform of the transmission signal (e.g., as for a pulse-width-modulated (PWM modulated) transmission signal, the amplitude and pulse width of the PWM modulated pulses) is changed. In this manner, it is possible to avoid an unwanted situation where the volume changes discontinuously before and after the impedance is changed. As a result, the performance of a wireless power transmission unit for a loudspeaker can be improved.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First of all, a variation in the volume of output audio, which is a problem that could be caused in an audio system that uses the magnetic resonance wireless power transmission technology, will be described.

Figure 21:
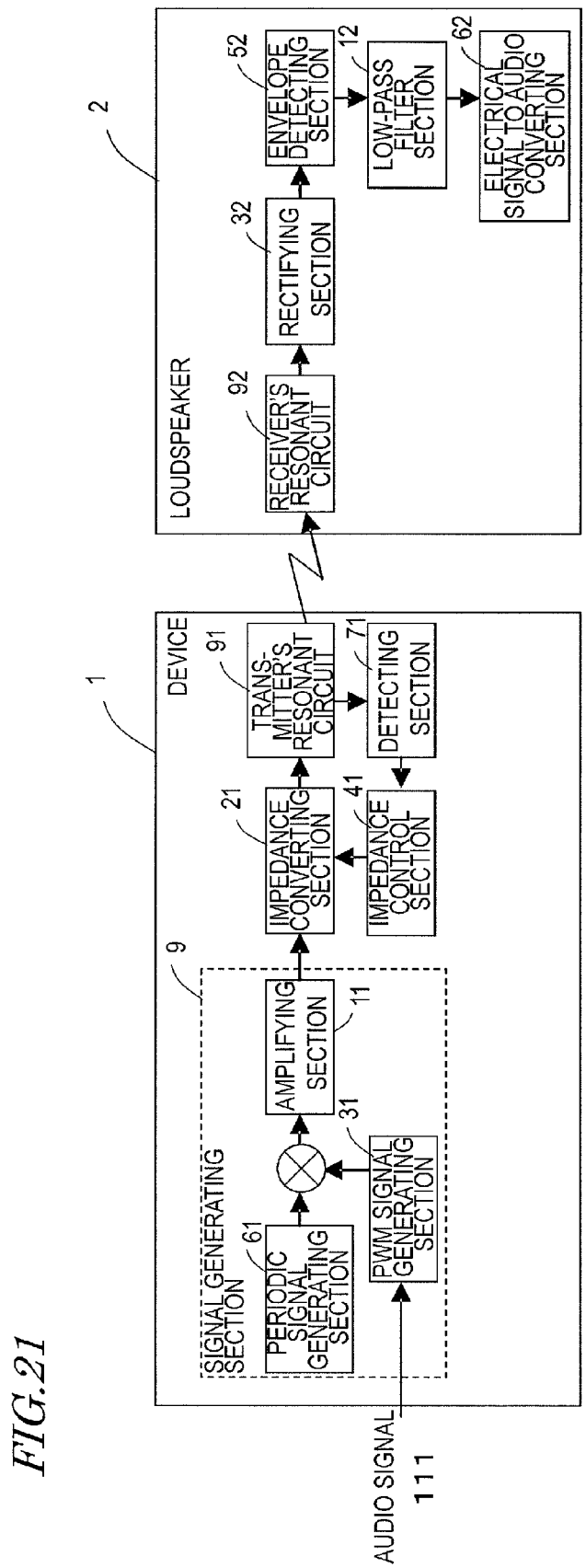
FIG. 21 illustrates a configuration for a wireless power transmission system for a loudspeaker as a comparative example.

FIG. 21 illustrates an audio system 900 that transmits wirelessly both electric power to drive a loudspeaker and an audio signal at the same time by the magnetic resonance method. The audio system 900 includes a device on the transmitting end 1 and a loudspeaker (which will be sometimes referred to herein as a "device on the receiving end") 2, for which a transmitter's resonant circuit 91 and a receiver's resonant circuit 92 are provided, respectively. By coupling together the transmitter's resonant circuit 91 and the receiver's resonant circuit 92 by utilizing the magnetic resonance phenomenon, electric power and an audio signal are transmitted wirelessly from the device on the transmitting end 1 to the loudspeaker (functioning as a device on the receiving end) 2.

If the transmitter's resonant circuit 91 and the receiver's resonant circuit 92 produce resonance between them at a resonant frequency fo, the periodic signal generating section 61 of the device 1 generates a periodic signal at that frequency fo. This periodic signal is used to transmit electric power wirelessly and may have a frequency of several ten MHz, for example. Meanwhile, a PWM signal generating section 31 converts the incoming audio signal 111 into a PWM modulated signal. More specifically, by using the periodic signal as a carrier, the PWM signal generating section 31 performs an amplitude modulation on the audio signal 111 with the PWM modulated signal. That signal that has been subjected to the amplitude modulation with the PWM modulated signal then has its signal amplitude amplified to a desired level by an amplifying section 11 and then the amplified signal thus obtained is output through the signal generating section 9. In this manner, a transmission signal, which is formed of the audio signal and the periodic signal for use to transmit electric power (or functioning as a carrier), is generated by the signal generating section 9 and then transmitted wirelessly from the transmitter's resonant circuit 91 to the receiver's resonant circuit 92.

In the system shown in FIG. 21, an impedance converting section 21 is interposed between the transmitter's resonant circuit 91 and the signal generating section 9 in order to control the impedance on the transmitting end. If the relative positions of the transmitter's resonant circuit 91 and the receiver's resonant circuit 92 change, then the impedance is no longer the best one. As a result, the waveform of the transmission signal varies at the transmitter's resonant circuit 91. By sensing such a variation in waveform, a detecting section 71 detects their current positions.

Based on the result of detection obtained by the detecting section 71, an impedance control section 41 controls the impedance converting section 21 so as to recover the best impedance value. Consequently, the transmission signal can be sent from the device 1 to the loudspeaker 2 with the best transfer efficiency.

The signal received at the receiver's resonant circuit 92 is rectified by a rectifying section 32. After that, an envelope detecting section 52 demodulates the rectified received signal into the PWM modulated signal. The signal thus obtained is then processed by a low-pass filter section 12 so that only a part of the signal in the audio frequency range is passed. In this manner, an audio signal is generated. Finally, that signal is converted by an electrical signal to audio converting section 62 to reproduce the audio.

Figure 20A:
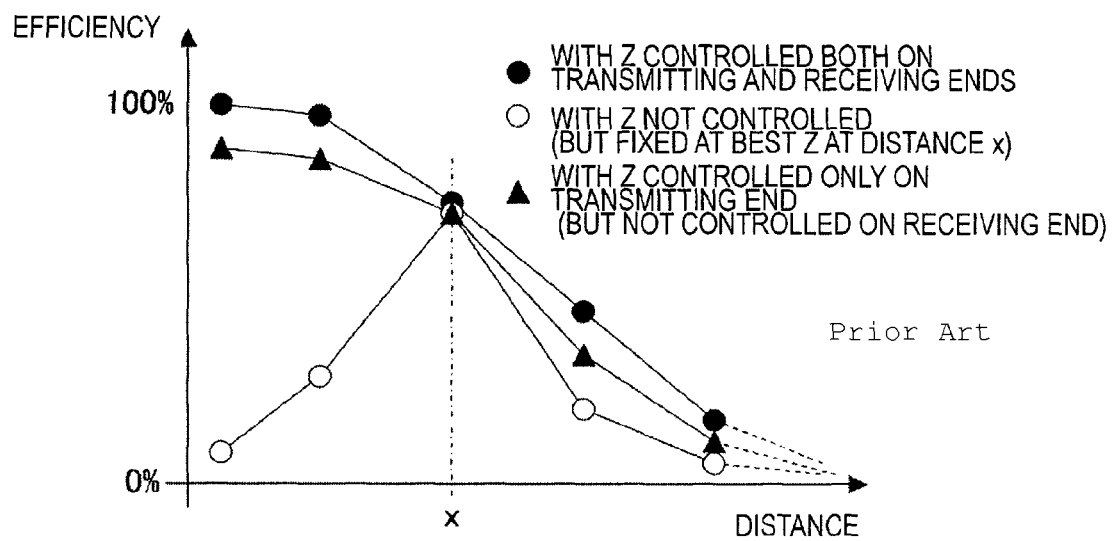
FIGS. 20A and 20B show how the transfer efficiency and the impedance value change with the distance according to the magnetic resonance method.
Figure 20B:
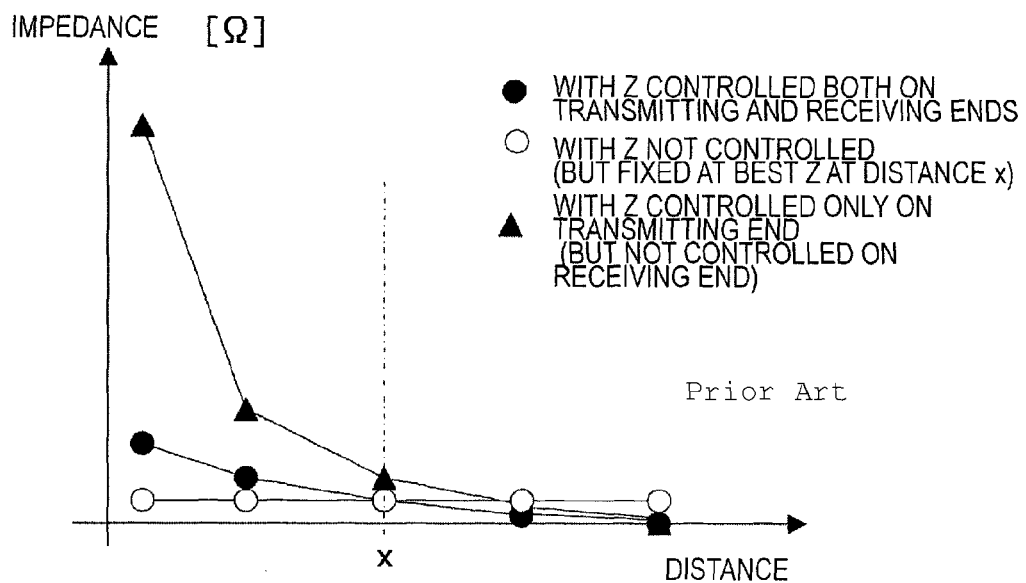

In a situation where electric power and an audio signal are transmitted from the audio device 1 itself to the loudspeaker 2 by the magnetic resonance method as described above, even if the impedance is controlled according to a variation in the distance between the audio device 1 and the loudspeaker 2, the transfer efficiency between the audio device 1 and the loudspeaker 2 still varies according to their distance. That is to say, even if the impedance is controlled appropriately, the transfer efficiency still decreases as the distance increases as shown in FIG. 20. As a result, the transmission signal received by the loudspeaker comes to have amplitude that varies with the distance, and the volume changes eventually.

Figure 22:
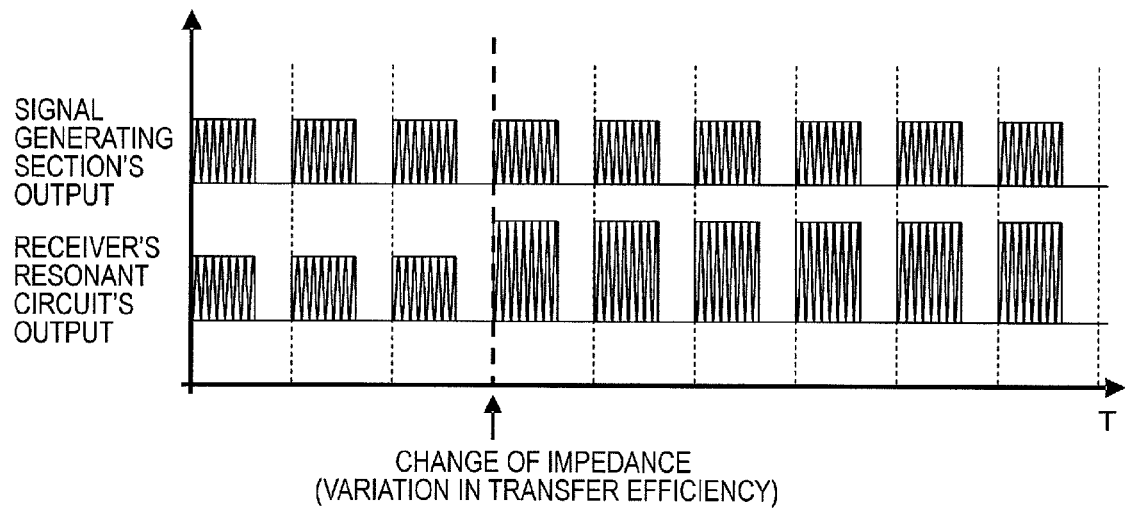
FIG. 22 shows how the waveform varies in the system shown in FIG. 21 when the impedance is changed.
Figure 23:
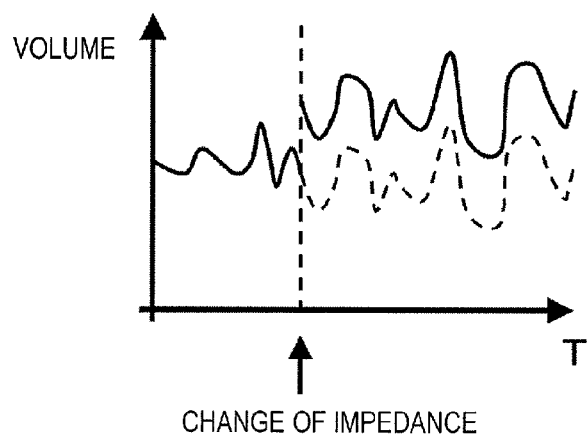
FIG. 23 shows how the volume varies in the system shown in FIG. 21 when the impedance is changed.

Also, in a situation where the impedance is controlled stepwise (or discretely), even if the output signal of the signal generating section 9 has constant amplitude, the transfer efficiency still changes discontinuously and at the instant the impedance value is switched as shown in FIG. 22. As a result, the output of the receiver's resonant circuit 92 changes discontinuously. Consequently, as shown in FIG. 23, the volume also changes discontinuously before and after the impedance value is switched.

The present inventors carried out intensive researches to find out means to overcome such a problem with the wireless power transmission audio system. As a result, the present inventors discovered that if the distance between the audio device and the loudspeaker changes, such an unwanted variation in the volume of the audio reproduced can be reduced significantly by appropriately controlling the waveform of the transmission signal with the decrease in transfer efficiency minimized by changing the impedance.

Hereinafter, preferred embodiments of the present invention will be described with reference to the accompanying drawings. It should be noted, however, that the present invention is in no way limited to the specific preferred embodiments to be described below.

Figure 1:
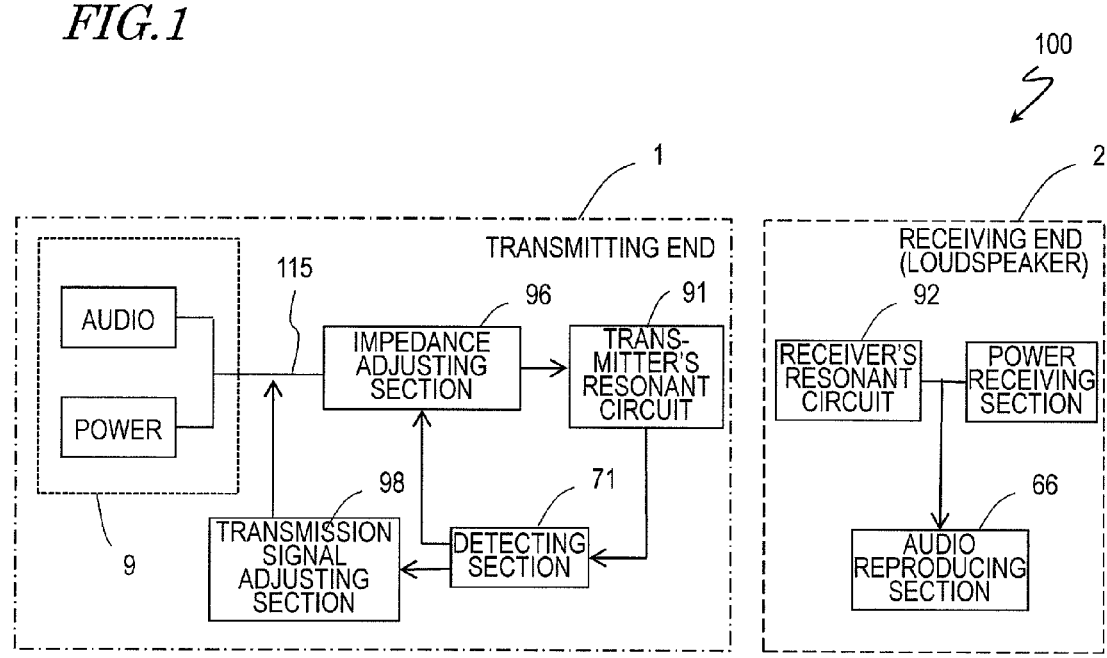
FIG. 1 is a block diagram illustrating an audio system as a preferred embodiment of the present invention.

FIG. 1 is a block diagram schematically illustrating a configuration for a wireless power transmission audio system 100 as a preferred embodiment of the present invention. As shown in FIG. 1, the audio system 100 includes an audio device 1 functioning as a device on the transmitting end and a loudspeaker 2 functioning as a device on the receiving end, to which electric power and an audio signal are transmitted wirelessly from the device 1.

The audio device 1 includes a transmission signal generating section 9 for generating a transmission signal 115, which is formed of an RF signal (periodic signal having relatively high frequency) for use to transmit electric power and an audio signal. It should be noted that the RF signal is also used as a carrier to transmit the audio signal. Then, the transmission signal 115 is output from the transmission signal generating section 9 to a transmitter's resonant circuit 91 through a transmission line with an impedance adjusting section 96, which can change the impedance value on the transmission line. For example, the impedance adjusting section 96 may adjust the impedances so that the output impedance of the signal generating section 9 and the input impedance of the transmitter's resonant circuit 91 match each other. The transmitter's resonant circuit 91 typically has a coil (not shown) and has a resonant frequency that is substantially equal to the frequency fo of the RF signal. It should be noted that if the frequency fo of the RF signal and the resonant frequency of a resonant circuit are slightly different from each other by 0 to 3% and substantially equal to each other, those frequencies will sometimes be regarded herein as being "equal to each other".

On the other hand, the loudspeaker 2 includes a receiver's resonant circuit 92, of which the resonant frequency is substantially equal to the carrier frequency fo. The receiver's resonant circuit 92 also typically has a coil (not shown, either). The loudspeaker 2 further includes an audio reproducing section 66 for reproducing audio based on the transmission signal 115 that has been received (or generated) at the receiver's resonant circuit 92.

A magnetic resonance phenomenon is produced between the transmitter's and receiver's resonant circuits 91 and 92 at the resonant frequency described above, thereby coupling those two resonant circuits 91 and 92 together. As a result, the transmission signal 115 can be transmitted wirelessly from the audio device 1 to the loudspeaker 2 with high transfer efficiency. In this preferred embodiment, the transmitter's and receiver's resonant circuits 91 and 92 are supposed to be coupled together by producing magnetic resonance between them using coils. However, electric power could also be transmitted wirelessly from the transmitter's resonant circuit to the receiver's resonant circuit by coupling those resonant circuits together with an electric field resonance phenomenon produced between their plates.

In this preferred embodiment, the audio device 1 includes a detecting section 71 that can sense a variation in the waveform of the transmission signal 115. The detecting section 71 may be connected to the transmitter's resonant circuit 91, for example, and may be implemented as a known detector that monitors the signal output (e.g., voltage, current or waveform itself) of the transmitter's resonant circuit 91 at predetermined timings.

As described above, if the distance between the audio device 1 and the loudspeaker 2 changes, the impedance at the resonant frequency also varies both on the transmitting end and on the receiving end (i.e., in the entire resonant system), and therefore, the transfer efficiency of the transmission signal 115 decreases. Also, if the impedance varies, the waveform of the transmission signal 115 also varies both at the device 1 and at the loudspeaker 2. That is why by making the detecting section 71 sense such a variation in the waveform of the transmission signal 115, it can be determined that the impedance of the resonant system is no longer the appropriate one. And the distance from the device 1 itself to the loudspeaker 2 can be estimated based on that variation.

According to this preferred embodiment, the impedance adjusting section 96 changes the impedance value on the propagation path of the transmission signal according to the output of the detecting section 71. In this case, the transmission signal's propagation path (or transmission line) is herein supposed to include the transmission line between the transmission signal generating section 9 and the transmitter's resonant circuit 91 at the audio device 1 and the transmission line between the receiver's resonant circuit 92 and a power receiving section at the loudspeaker 2. In the preferred embodiment illustrated in FIG. 1, the impedance adjusting section 96 is supposed to be provided for the device 1. Alternatively, the impedance adjusting section may be provided for the loudspeaker 2 as will be described later. Or both the device 1 and the loudspeaker 2 may have their own impedance adjusting section.

In this description, a signal generated by the receiver's resonant circuit through the magnetic (or electric field) resonant coupling is herein referred to as a "transmission signal on the loudspeaker end". In this preferred embodiment, the transmission signal on the loudspeaker end is an RF signal that has been supplied from the receiver's resonant circuit, having an envelope corresponding to the pulse-width-modulated audio signal.

As the impedance adjusting section 96 changes the impedance value so as to match the impedances of the audio device 1 and the loudspeaker 2 to each other on the propagation path, the transfer efficiency increases. That is to say, the impedance adjusting section 96 adjusts the impedances so as to increase the transfer efficiency of the transmission signal. If the transfer efficiency increases, however, the volume of the audio reproduced changes as already described with reference to FIGS. 22 and 23. Particularly when the impedance adjusting section 96 is made up of circuits that change the impedance discretely, the volume will change suddenly and steeply.

Thus, to check such a steep change of the volume, the audio device 1 further includes a transmission signal adjusting section 98, which is designed to adjust the waveform of the transmission signal 115. When the impedance adjusting section 96 is controlling the impedance on the transmission line, the transmission signal adjusting section 98 adjusts the amplitude and other parameters of the transmission signal 115 based on the output of the detecting section 71. For example, if the transmission signal is formed by combining together the periodic signal (carrier) for use to transmit electric power and the PWM modulated (pulse-width-modulated) audio signal, the transmission signal adjusting section 98 controls either the amplitude or the pulse width (duty ratio) of the transmission signal. The transmission signal thus formed typically has an envelope that represents a PWM signal. And the PWM signal defined by the envelope corresponds to the audio signal. That is why "to control the pulse width of the transmission signal" herein means controlling the pulse width of the PWM signal.

While the impedance adjusting section 96 is increasing the transfer efficiency by changing the impedance value, the transmission signal adjusting section 98 operates so as to decrease either the amplitude or the pulse width of the transmission signal 115. As a result, it is possible to prevent the audio reproduced by the loudspeaker 2 from changing excessively. On top of that, since impedance matching is done appropriately, the decrease in transfer efficiency can be minimized.

In the preferred embodiment illustrated in FIG. 1, the transmission signal adjusting section 98 is supposed to adjust directly the transmission signal 115 that is formed of the audio signal and the electric power signal. However, the present invention is in no way limited to that specific preferred embodiment. Alternatively, the signal may also be adjusted by a circuit that generates the audio signal. Rather, any other configuration may also be adopted as long as the waveform of the transmission signal can be adjusted.

As described above, in the audio system 100 of this preferred embodiment, even if the distance between the audio device (i.e., the device on the transmitting end) 1 and the loudspeaker 2 (or their relative positions) changes, audio of better quality can still be reproduced with the decrease in transfer efficiency minimized. On top of that, this audio system 100 can be used effectively not only when the transfer efficiency decreases due to such a change of the relative positions of the device on the transmitting end 1 and the loudspeaker 2 but also when the transfer efficiency decreases due to any other external factor. For example, even when there is an obstacle between the device on the transmitting end 1 and the loudspeaker 2, the transfer efficiency will also decrease. However, if the transfer efficiency can be increased by changing the impedance value on the transmission line, the audio system 100 of this preferred embodiment can also be used appropriately.

Hereinafter, more specific preferred embodiments of the present invention will be described.

Embodiment 1

Figure 2:
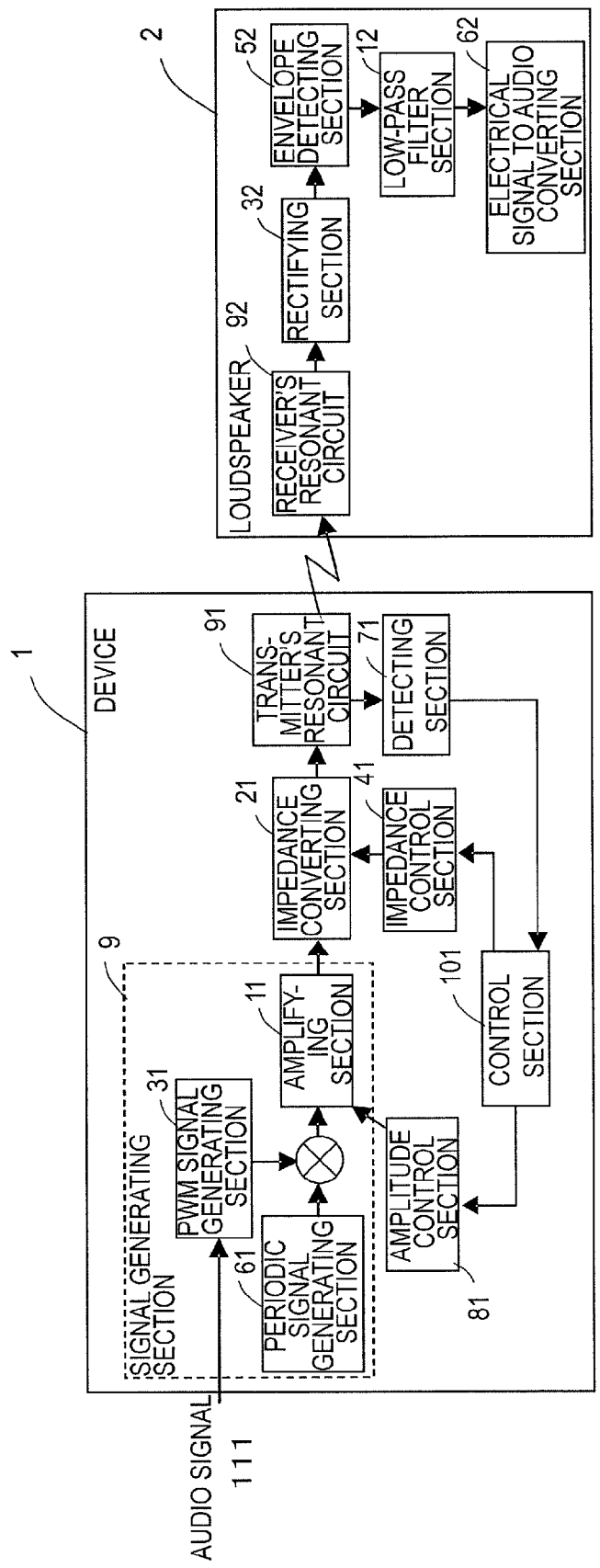
FIG. 2 illustrates a configuration for an audio system as a first preferred embodiment of the present invention.

FIG. 2 illustrates an exemplary arrangement of functional blocks in a wireless power transmission audio system (i.e., a system for transmitting power wirelessly to a loudspeaker) as a first specific preferred embodiment of the present invention. The audio system of this first preferred embodiment is comprised of a device on the transmitting end (which will also be referred to herein as an "audio device") 1 and a loudspeaker (which function as a device on the receiving end) 2.

The device 1 includes a signal generating section (which is equivalent to the transmission signal generating section as defined in the claims) 9 and a transmitter's resonant circuit 91. The signal generating section 9 includes a PWM signal generating section 31, a periodic signal generating section 61, and an amplifying section 11. The device 1 further includes an impedance converting section and an impedance control section 41, which are used to adjust the impedance, between the signal generating section 9 and the transmitter's resonant circuit 91. In this description, the impedance converting section 21 and the impedance control section 41 will sometimes be collectively referred to herein as an "impedance adjusting section". The device 1 further includes a detecting section 71 to detect the waveform of the transmission signal, an amplitude control section 81, and a control section 101, which is designed to control the amplitude control section 81 and the impedance control section 41 in accordance with the output of the detecting section 71.

On the other hand, the loudspeaker 2 includes a receiver's resonant circuit 92, a rectifying section 32, an envelope detecting section 52, a low-pass filter section 12, and an electrical signal converting section (i.e., electrical signal to audio converting section) 62.

Each of the transmitter's resonant circuit 91 and the receiver's resonant circuit 92 is made up of a transmission coil (or a reception coil), and a capacitor, an inductor or a combination thereof, which is connected either in series or in parallel to the transmission coil (or reception coil).

The respective inductors are preferably made of copper, silver or any other conductor with good electrical conductivity. If the transmission and reception coils are formed by using Litz wires, for example, then the conductor loss per unit length can be reduced and the Q factors of the series resonant circuit and the parallel resonant circuit can be increased. As a result, power can be transmitted with even higher efficiency.

The transmitter's resonant circuit 91 and the receiver's resonant circuit 92 are designed to have the same resonant frequency fo. These resonant circuits are magnetically coupled together at the resonant frequency fo via the magnetic resonance phenomenon, and the periodic signal is transmitted between them by a non-contact method. The periodic signal generating section 61 of the device 1 generates a periodic signal, of which the frequency fo is equal to the resonant frequency fo described above (and which may be an RF signal with a frequency of several ten MHz), as a signal to transmit electric power.

It should be noted that the frequency of the periodic signal generated by the periodic signal generating section 61 is defined based on the resonant frequency fo of the transmitter's and receiver's resonant circuits 91 and 92. Typically, these two frequencies are set to be equal to each other. However, even though the resonant frequency of those resonant circuits and the frequency of the periodic signal are said to be "equal to each other", those two frequencies may be herein slightly different from each other by 0% to 3% as described above.

Figure 5:
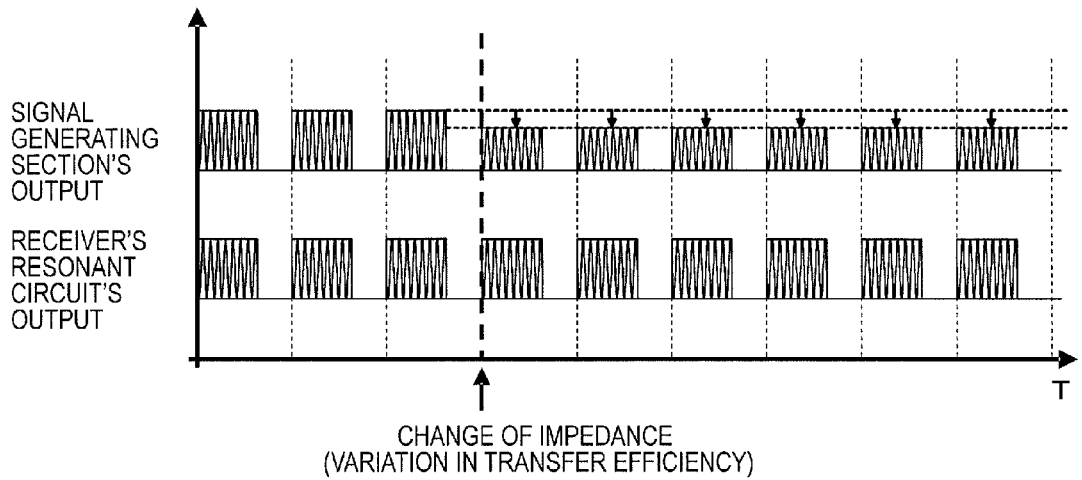
FIG. 5 shows how the waveform varies in the audio system of the first preferred embodiment when the impedance is changed.

The audio signal 111 to be transmitted from the device 1 to the loudspeaker 2 is converted into a PWM modulated signal by the PWM signal generating section 31 and then multiplied by the output of the periodic signal generating section 61 (i.e., the carrier) at a multiplying section. As a result, a transmission signal is generated by subjecting the carrier with the frequency fo to an amplitude modulation (AM) with the PWM modulated signal as shown in FIG. 5. After that, this transmission signal has its amplitude amplified to a desired level by the amplifying section 11 and then is output from the signal generating section 9.

The audio signal 111 may be supplied from a portable music player or display device that is connected as an external device to the device on the transmitting end (i.e., audio device) 1. Alternatively, the audio signal 111 may also be an analog or digital signal that has been read from the internal storage of the device on the transmitting end 1. Although the power transmitting RF signal for use as a carrier has its frequency set to be several ten MHz, the PWM signal generated by the PWM signal generating section 31 (i.e., a pulse-width-modulated audio signal) has its frequency set to be at most around several hundred KHz.

According to the magnetic resonance method, in order to increase the transfer efficiency, it is important to control one or both of the impedance of the transmitter as viewed from the transmitter's resonant circuit 91 and that of the receiver as viewed from the receiver's resonant circuit 92. According to this first preferred embodiment, an arrangement for controlling the transmitter's impedance as viewed from the transmitter's resonant circuit 91 is adopted and the impedance converting section 21 is arranged between the signal generating section 9 (more exactly, the amplifying section 11) and the transmitter's resonant circuit 91.

The impedance converting section 21 may be designed to control the impedance continuously using a variable inductor or a variable capacitor. Alternatively, the impedance converting section 21 may also be designed to set discrete impedance values using multiple inductors or capacitors and control the impedance gradually and discretely by changing those values with switches turned.

Figure 3:
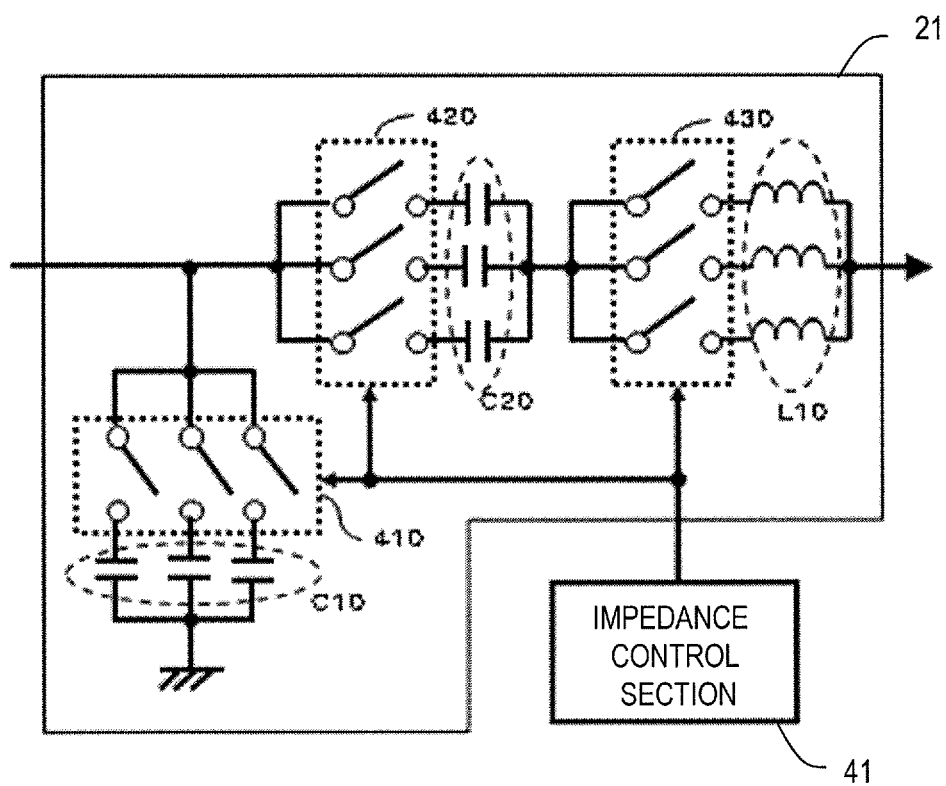
FIG. 3 illustrates an exemplary circuit configuration for an impedance converting section.

FIG. 3 illustrates an exemplary circuit configuration for the impedance converting section 21. As shown in FIG. 3, the impedance converting section 21 may include a group of parallel grounded capacitors C10 with switches 410 to change their connection, a group of series capacitors C20 with switches 420 to change their connection, and a group of series inductors L10 with switches 430 to change their connection. Each of these two groups of capacitors C10 and C20 is formed of multiple capacitors with mutually different capacitances. Likewise, the group of inductors L10 is made up of inductors with mutually different inductances. By turning the switches 410, 420 and 430 appropriately in accordance with a control signal supplied from the impedance control section 41, the impedance value of the circuit can be changed. As a result, the impedances of the device on the transmitting end and the loudspeaker can be matched to each other. When an impedance converting section 21 with such a configuration is adopted, the impedance value is selectively determined to be one of multiple values and the impedance value changes discretely.

Now take a look at FIG. 2 again. The transmission signal that has been output from the transmitter's resonant circuit 91 is received at the receiver's resonant circuit 92 of the loudspeaker 2. Next, the transmission signal received is rectified by the rectifying section 32, and the PWM signal is demodulated by the envelope detecting section 52. After that, the low-pass filter section 12 passes only a part of the signal falling within the audio signal range, thereby extracting the audio signal. And the signal that has passed through the low-pass filter section 12 is eventually converted and reproduced as audio by the electric signal to audio converting section 62.

If the impedance value can no longer contribute to achieving the best transfer efficiency due to a change of the relative positions of the transmitter's resonant circuit 91 and the receiver's resonant circuit 92, then waveform parameters (including a voltage value, a current value and the waveform itself) of the transmission signal will change at the transmitter's resonant circuit 91. And by making the detecting section 71 sense such a variation in the waveform, the change of the relative positions is detected and the control section 101 is notified of the result of detection.

Figure 4:
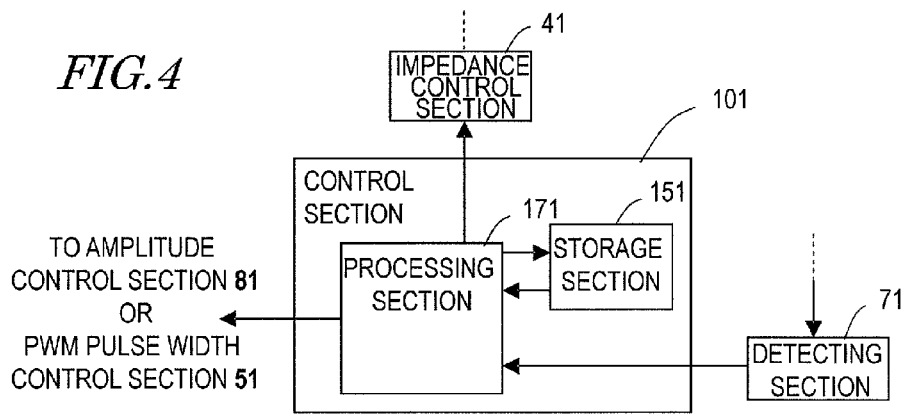
FIG. 4 illustrates a configuration for the control section of the audio system of the first preferred embodiment.

As shown in FIG. 4, the control section 101 is made up of a processing section 171 and a storage section 151, in which stored in advance is the relation between the impedance values, the waveform parameters of the transmitter's resonant circuit 91, and the distance between the transmitter's and receiver's resonant circuits 91 and 92.

The processing section 171 determines the distance between the transmitter's and receiver's resonant circuits 91 and 92 (i.e., the transfer distance) based on their impedance values that have been set and the waveform parameters of the transmitter's resonant circuit 91.

If the relative positions of the transmitter's resonant circuit 91 and the receiver's resonant circuit 92 have changed, then the processing section 171 of the control section 101 controls the impedance value of the impedance adjusting section so as to optimize the transfer efficiency. In this case, if the impedance value is controlled, the transfer efficiency changes. As a result, the volume of the audio output through the loudspeaker eventually changes as shown in FIGS. 22 and 23. To avoid changing the volume of the output audio, when the transfer efficiency increases, the output amplitude of the signal generating section 9 is preferably decreased accordingly. In that case, the output signal of the receiver's resonant circuit never changes discontinuously as shown in FIG. 5 before and after the impedance value is changed. Consequently, the volume of the audio output through the loudspeaker 2 can be kept constant. As described above, the storage section 151 stores in advance the relation between the impedance values, the waveform parameters of the transmitter's resonant circuit 91 and the distance between the transmitter's and receiver's resonant circuits 91 and 92. In addition to these pieces of information, the storage section 151 also stores the relation between the impedance settings adopted, the transfer distance, and the maximum transfer efficiency achieved at that time.

In this case, if the product of the transfer efficiency and the amplitude of the transmission signal at the transmitter's resonant circuit 91 remains substantially the same before and after the impedance value is changed, then the volume of the audio output through the loudspeaker 2 hardly changes. That is why in changing the impedance value, the processing section 171 determines the amplification factor and impedance value to adopt newly so that the product of the transfer efficiency and the amplitude of the transmission signal at the transmitter's resonant circuit 91 remains substantially the same, and then outputs the amplification factor and impedance value to the amplitude control section 81 and the impedance control section 41, respectively.

In this first preferred embodiment, the audio signal is transmitted as a pulse-width-modulated signal. That is why a no-signal interval appears iteratively between those pulses. If the impedance value is changed during a period with a pulse (i.e., while the pulse-width-modulated signal is high), the operation of the circuit could make some noise while the impedance value is changed. For that reason, in each no-signal interval between two pulses (i.e., while the pulse-width-modulated signal is low), the control section 101 instructs the amplitude control section 81 and the impedance control section 41 to change the amplification factor and the impedance value, respectively, by sending a control signal to each of them. In response, the amplitude control section 81 controls the amplification factor of the amplifying section 11, while the impedance control section 41 controls the impedance value of the impedance converting section 21.

If the distance between the device 1 and the loudspeaker 2 has changed, the audio system of the preferred embodiment described above changes the impedance value so as to achieve the best transfer efficiency, thereby minimizing a decrease in transfer efficiency. In addition, by controlling the amplification factor of the amplifying section 11 when the impedance value is changed, the audio system can also prevent the loudspeaker 2 from changing the volume of its output audio discontinuously before and after the impedance value is changed.

Figure 6:
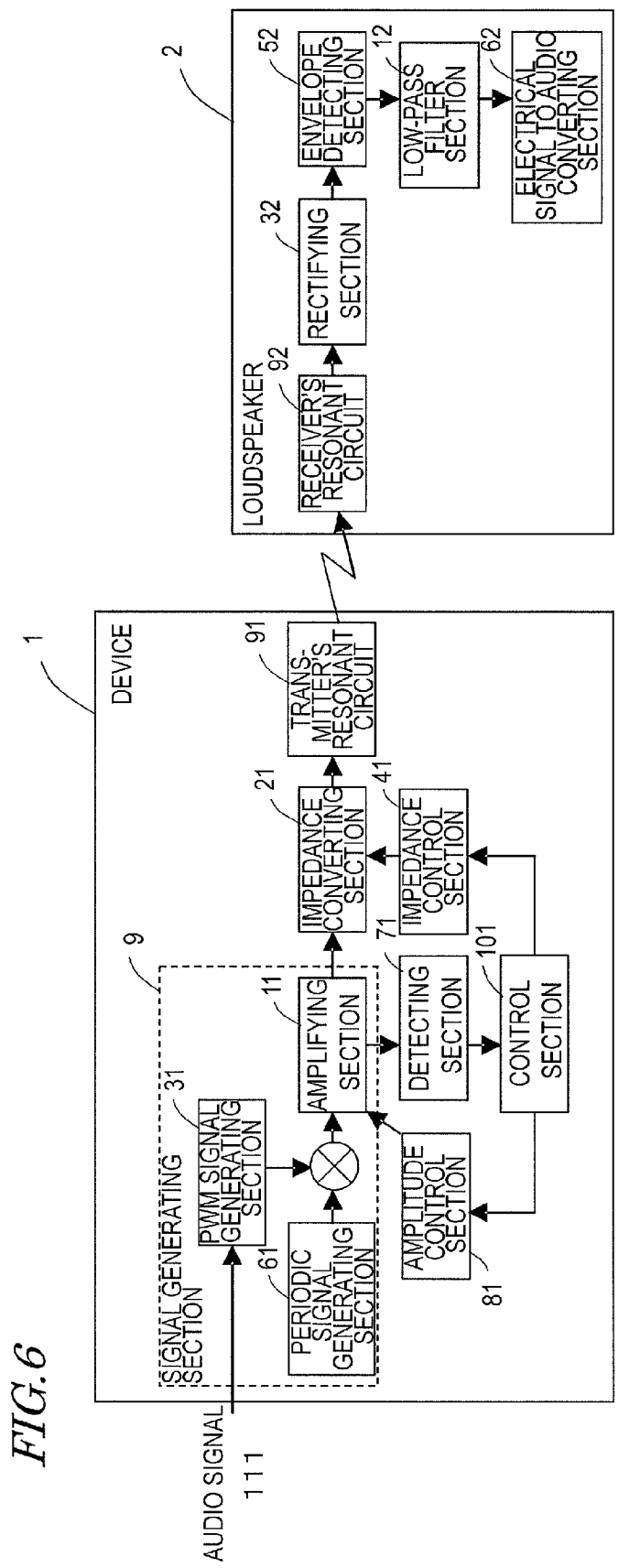
FIG. 6 illustrates a modified example of the audio system of the first preferred embodiment.

In the first preferred embodiment described above, the waveform parameters of the transmission signal of the transmitter's resonant circuit 91 are supposed to be detected by the detecting section 71. However, the waveform parameters of the transmission signal of the amplifying section 11 may also be detected by the detecting section 71 as shown in FIG. 6.

Also, in the first preferred embodiment of the present invention described above, the loudspeaker 2 is supposed to be designed so that the rectifying section 32 receives the output of the receiver's resonant circuit 92. However, the loudspeaker 2 may also be designed so that the output of the receiver's resonant circuit 92 is directly supplied to the envelope detecting section 52.

Embodiment 2

Figure 7:
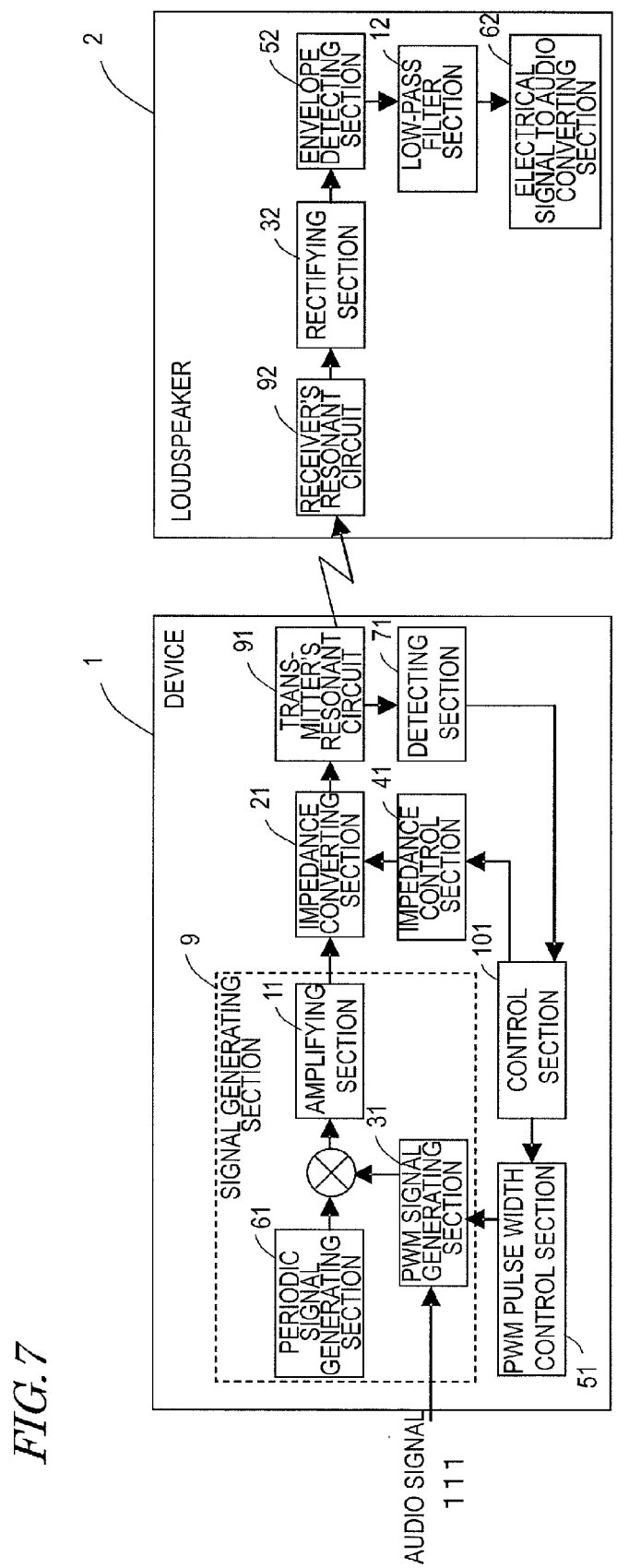
FIG. 7 illustrates a configuration for an audio system as a second preferred embodiment of the present invention.

FIG. 7 illustrates an exemplary arrangement of functional blocks in a wireless power transmission audio system as a second preferred embodiment of the present invention. In FIG. 7, any component also included in the wireless power transmission audio system of the first preferred embodiment described above and having substantially the same function as its counterpart is identified by the same reference numeral and description thereof will be omitted herein.

In the first preferred embodiment described above, the amplification factor of the transmission signal of the amplifying section 11 in the signal generating section 9 is changed in order to prevent the volume of the output audio from changing before and after the impedance value is changed. On the other hand, according to this second preferred embodiment, the variation in the volume of the reproduced audio is reduced by controlling the pulse width of the PWM modulated signal when the PWM signal generating section 31 modulates the audio signal 111.

Figure 8:
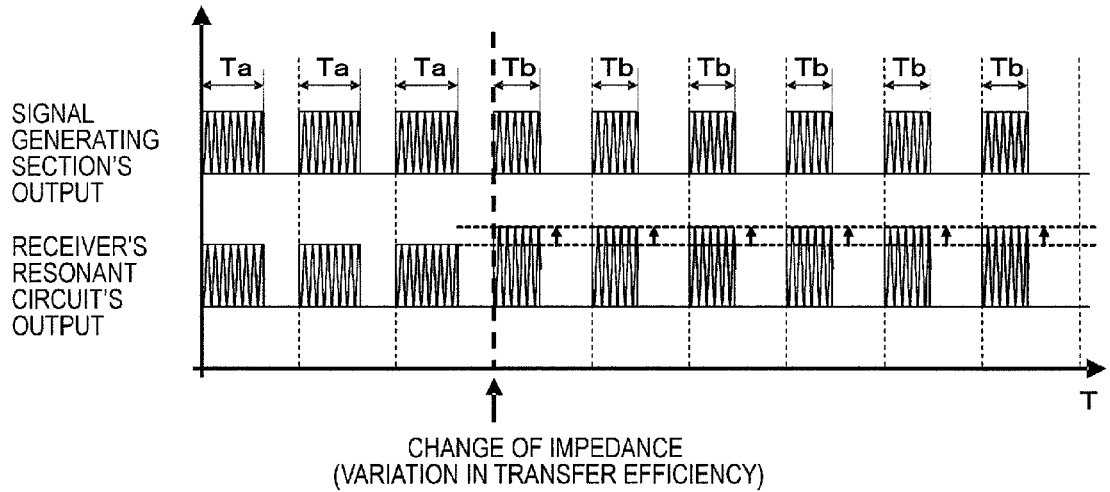
FIG. 8 shows how the waveform varies in the audio system of the second preferred embodiment when the impedance is changed.

In controlling the impedance value based on the result of detection obtained by the detecting section 71, the control section 101 instructs a PWM pulse width control section 51 to change the rate of the PWM modulation carried out by the PWM signal generating section 31 (i.e., a rate indicating how much the pulse width needs to be changed with respect to the input value of the audio signal 111). In the first preferred embodiment of the present invention described above, the output amplitude of the signal generating section 9 is changed so that the product of the transfer efficiency and the signal amplitude of the transmitter's resonant circuit 91 becomes constant, thereby preventing the output of the receiver's resonant circuit 92 from changing discontinuously. On the other hand, according to this preferred embodiment, if the transfer efficiency has varied (e.g., increased in the example illustrated in FIG. 8) due to a change of the impedance value, the variation in the output amplitude of the receiver's resonant circuit 92 before and after the impedance value is changed is reduced by decreasing the pulse width as shown in FIG. 8.

Specifically, the pulse width of the PWM modulated pulses is decreased from Ta to Tb and controlled so that the product of the signal amplitude and the pulse width, which is the output of the receiver's resonant circuit 92, becomes substantially constant.

In the loudspeaker 2, the low-pass filter section 12 is arranged after the receiver's resonant circuit 92, and therefore, the PWM pulses, of which the signal amplitude-pulse width product is substantially the same, contain the same piece of information even if their signal amplitudes are different. Consequently, it is possible to prevent the volume of the audio output through the loudspeaker 2 from changing discontinuously before and after the impedance is changed.

As described above, by controlling the rate of PWM modulation on the audio signal 111 when the impedance value is changed so as to achieve the best transfer efficiency even if the distance between the device 1 and the loudspeaker 2 has changed, it is possible to prevent the volume of the audio output through the loudspeaker 2 from changing discontinuously before and after the impedance value is changed.

Figure 9:
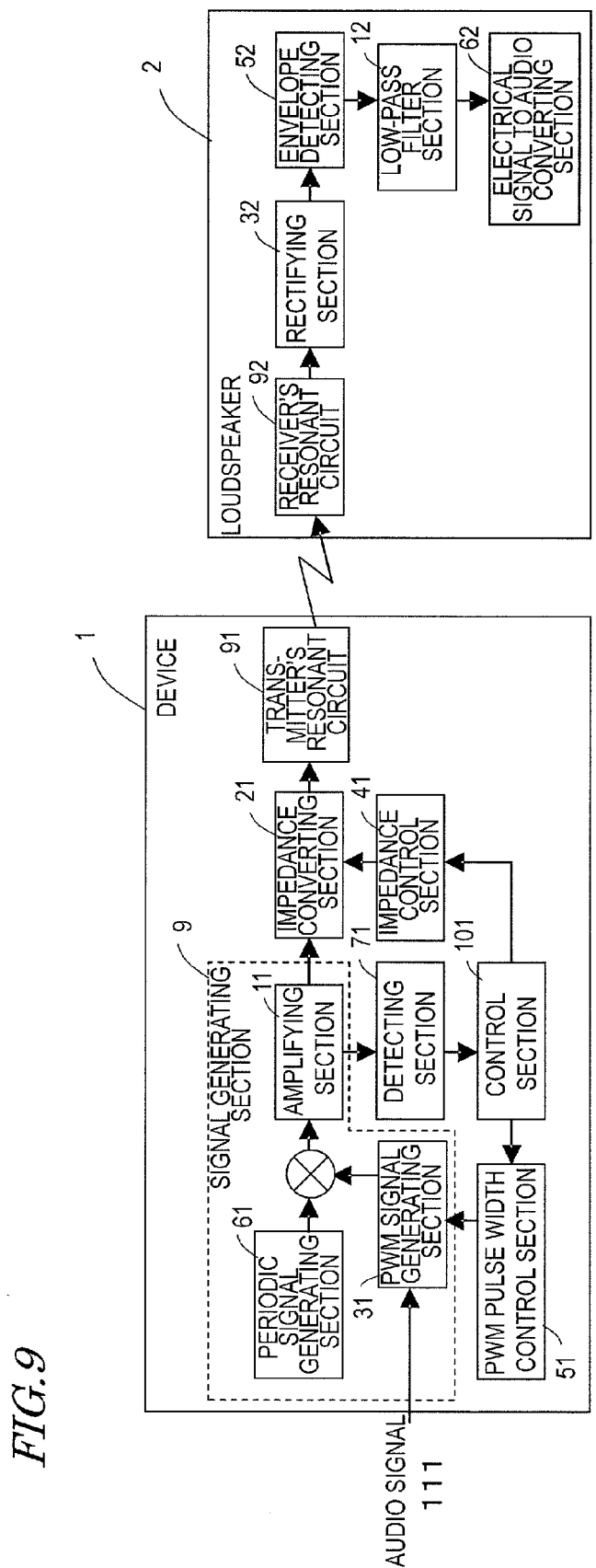
FIG. 9 illustrates a modified example of the audio system of the second preferred embodiment.

In the second preferred embodiment described above, the waveform parameters (i.e., signal waveforms) of the transmitter's resonant circuit 91 are supposed to be detected by the detecting section 71. However, the waveform parameters of the amplifying section 11 may also be detected by the detecting section 71 as shown in FIG. 9.

Also, in the second preferred embodiment of the present invention described above, the loudspeaker 2 is supposed to be designed so that the rectifying section 32 receives the output of the receiver's resonant circuit 92. However, the loudspeaker 2 may also be designed so that the output of the receiver's resonant circuit 92 is directly supplied to the envelope detecting section 52.

Embodiment 3

Figure 10:
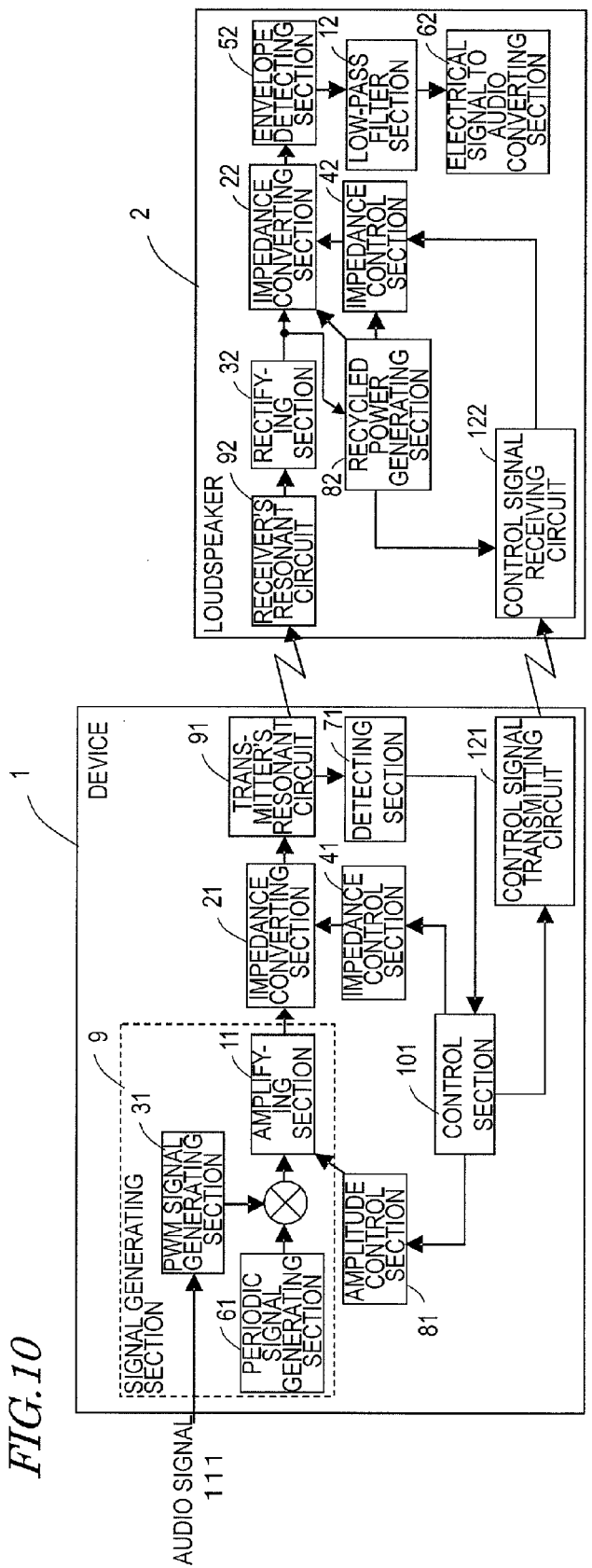
FIG. 10 illustrates a configuration for an audio system as a third preferred embodiment of the present invention.

FIG. 10 illustrates an exemplary arrangement of functional blocks in a wireless power transmission audio system as a third preferred embodiment of the present invention. In FIG. 10, any component also included in the wireless power transmission audio system of the first or second preferred embodiment described above and having substantially the same function as its counterpart is identified by the same reference numeral and description thereof will be omitted herein.

In the first and second preferred embodiments of the present invention described above, only the device 1 is supposed to be provided with the impedance adjusting section. However, in this third preferred embodiment, both of the device 1 and the loudspeaker 2 include the impedance adjusting section, each of which includes an impedance converting section 21, 22.

The PWM modulated signal received at the receiver's resonant circuit 92 is rectified by the rectifying section 32. In the meantime, a recycled power generating section 82 recycles a part of the transmission signal to generate energy, which is used as electric power, and then outputs the energy as a PWM modulated signal to the impedance converting section 22.

The recycled power generated by the recycled power generating section 82 is used as electric power to drive the control signal receiving circuit 122, the impedance converting section 22, and the impedance control section 42. Meanwhile, in the device 1, the variation in the waveform parameters of the transmitter's resonant circuit 91 is sensed by the detecting section 71 and the control section 101 controls the impedance value and the amplitude control section 81 based on the result of detection as in the first and second preferred embodiments of the present invention described above.

In this preferred embodiment, in order to control the impedance value on the receiving end, too, the control section 101 transmits a control signal to control the impedance control section 42 to the control signal receiving circuit 122 via a control signal transmitting circuit 121. The control signal may be transmitted from the control signal transmitting circuit 121 to the control signal receiving circuit 122 by any known telecommunications technology.

In accordance with the control signal received, the impedance control section 42 controls and converts the impedance value of the impedance converting section 22. In this manner, the impedance value can be controlled both on the transmitting and receiving ends alike.

In the storage section 151 of the control section 101 (FIG. 4), stored in advance is the relation between the transmitter's and receiver's impedance values, the waveform parameters of the transmitter's resonant circuit 91, and the distance between the transmitter's and receiver's resonant circuits 91 and 92. In addition to these pieces of information, also stored there is the relation between the respective impedance settings of the transmitter's and receiver's, the transfer distance, and the highest transfer efficiency achieved in that case. And as in the first preferred embodiment described above, the control section 101 switches the impedance control sections 41, 42 and the amplitude control section 81 at the same time so as to prevent the volume of the audio output through the loudspeaker 2 from changing discontinuously before and after the impedance value is changed. By controlling the transmitter's and receiver's impedance values, the transfer efficiency between the transmitter's resonant circuit 91 and the receiver's resonant circuit 92 can be increased and the power dissipation can be cut down.

As described above, by controlling the amplification factor of the amplifying section 11 when the transmitter's and receiver's impedance values are both changed in order to achieve the best transfer efficiency even if the distance between the device 1 and the loudspeaker 2 has varied, it is possible to prevent the volume of the audio output through the loudspeaker 2 from changing discontinuously before and after the impedance value is changed.

Figure 11:
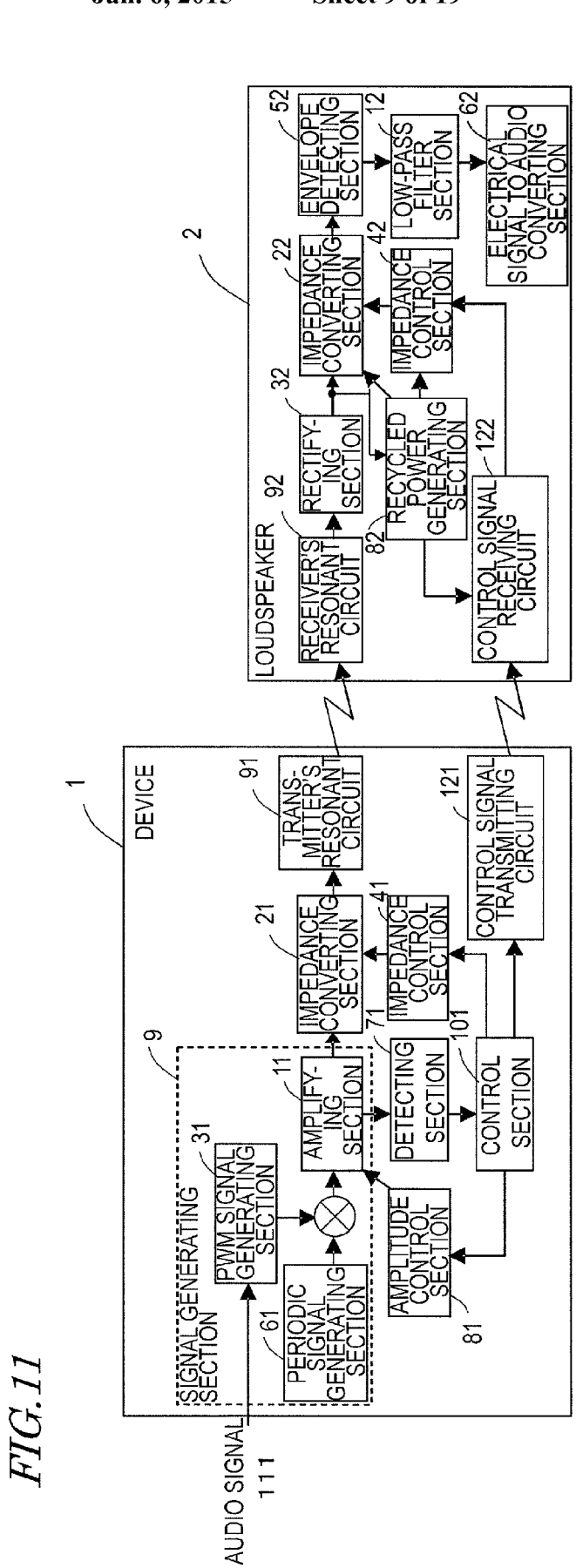
FIG. 11 illustrates a modified example of the audio system of the third preferred embodiment.

In the third preferred embodiment described above, the waveform parameters of the transmitter's resonant circuit 91 are supposed to be detected by the detecting section 71. However, the waveform parameters of the amplifying section 11 may also be detected by the detecting section 71 as shown in FIG. 11.

Also, in the third preferred embodiment of the present invention described above, the loudspeaker 2 is supposed to be designed so that the rectifying section 32 rectifies the output of the receiver's resonant circuit 92. However, the loudspeaker 2 may also be designed so that the output of the receiver's resonant circuit 92 is directly supplied to the envelope detecting section 52.

Embodiment 4

Figure 12:
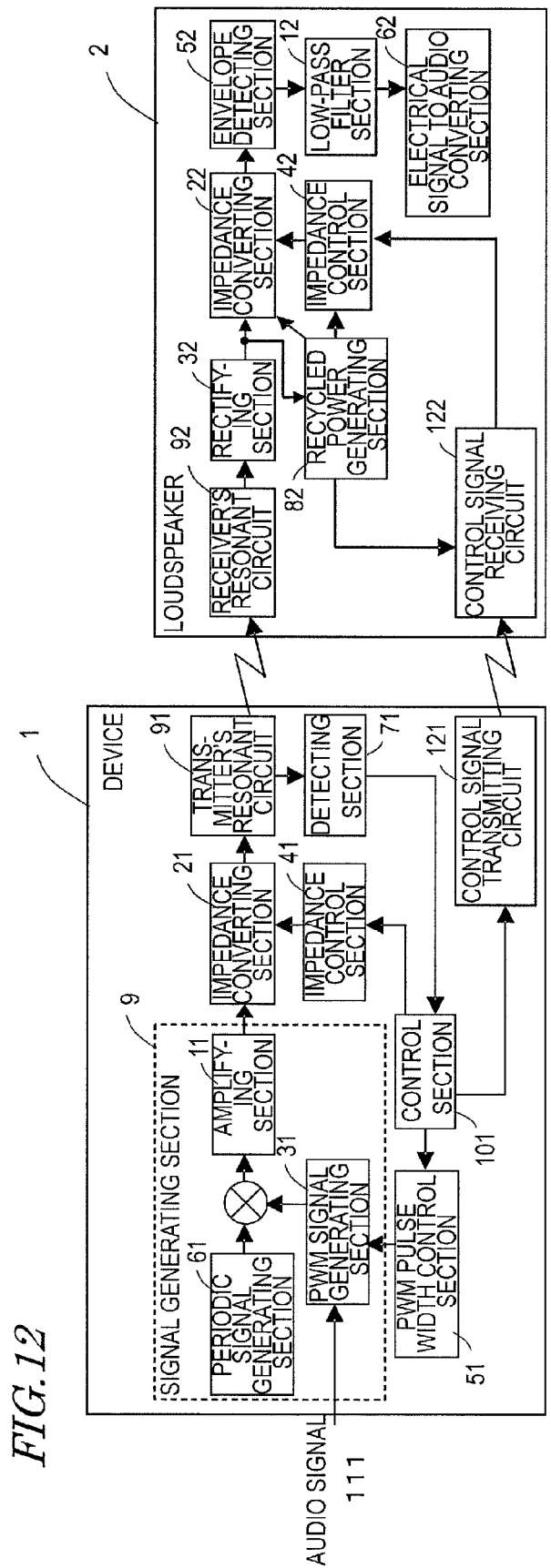
FIG. 12 illustrates a configuration for an audio system as a fourth preferred embodiment of the present invention.
Figure 13:
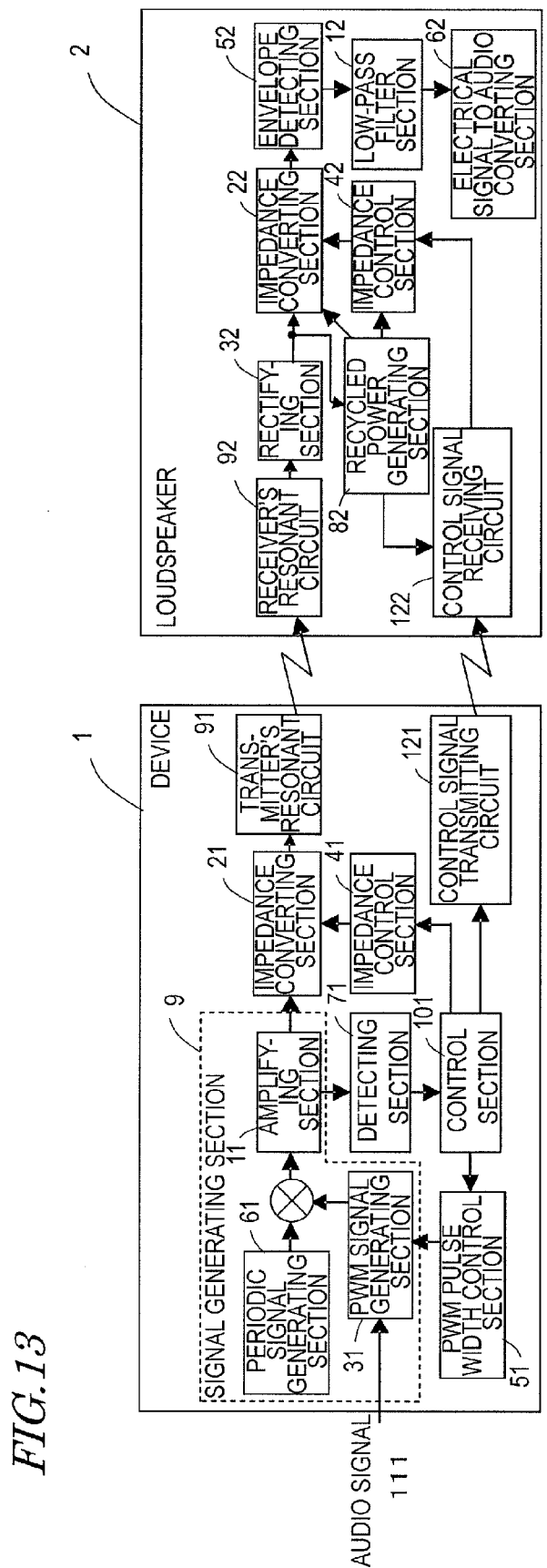
FIG. 13 illustrates a modified example of the audio system of the fourth preferred embodiment.

FIGS. 12 and 13 illustrate an exemplary arrangement of functional blocks in a wireless power transmission audio system as a fourth preferred embodiment of the present invention. In FIGS. 12 and 13, any component also included in the wireless power transmission audio system of the first, second or third preferred embodiment described above and having substantially the same function as its counterpart is identified by the same reference numeral and description thereof will be omitted herein.

In the third preferred embodiment of the present invention described above, the waveform parameters of the transmitter's resonant circuit 91 (or the amplifying section 11) are supposed to be detected by the detecting section 71 and the amplification factor of the amplifying section 11 of the signal generating section 9 is supposed to be changed in order to prevent the volume of the output audio from changing before and after the impedance value is changed. On the other hand, according to this fourth preferred embodiment, such a change of the volume of the output audio is avoided by having the pulse width of the PWM modulated signal, which is obtained by modulating the audio signal 111, controlled at the PWM signal generating section 31. According to this fourth preferred embodiment, by controlling both the transmitter's and receiver's impedances as in the third preferred embodiment described above and by controlling the pulse width of the PWM modulated signal as in the second preferred embodiment described above, it is possible to prevent the volume of the audio output through the loudspeaker 2 from changing discontinuously before and after the impedance values are changed both on the transmitting and receiving ends.

Embodiment 5

Figure 14:
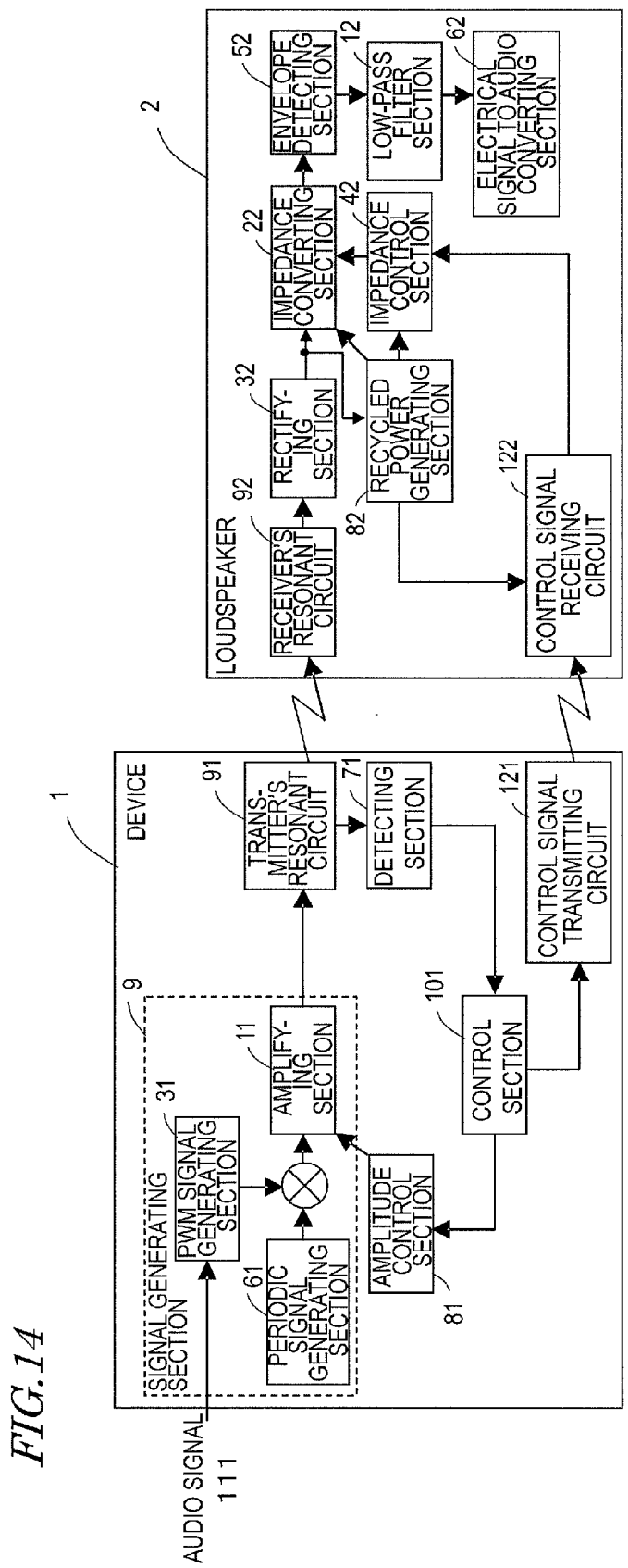
FIG. 14 illustrates a configuration for an audio system as a fifth preferred embodiment of the present invention.
Figure 15:
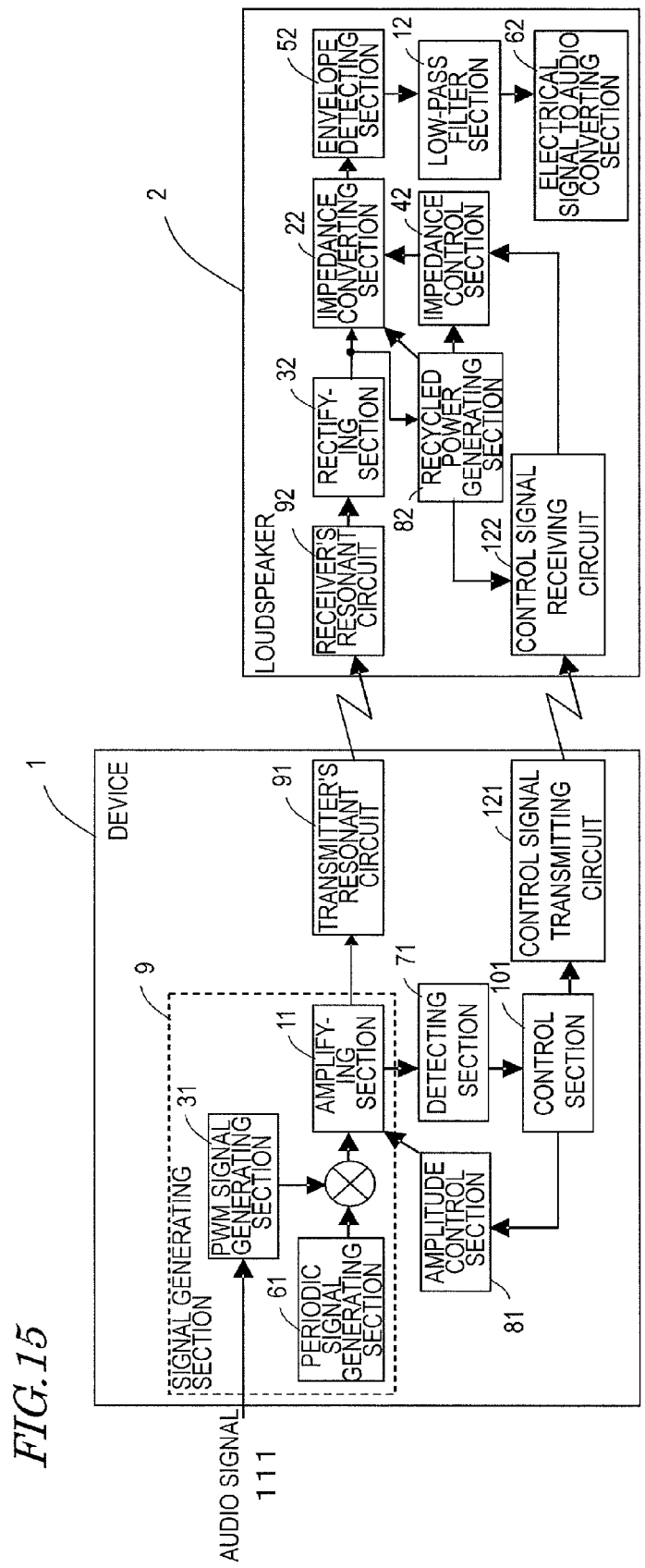
FIG. 15 illustrates a modified example of the audio system of the fifth preferred embodiment.

FIGS. 14 and 15 illustrate an exemplary arrangement of functional blocks in a wireless power transmission audio system as a fifth preferred embodiment of the present invention. In FIGS. 14 and 15, any component also included in the wireless power transmission audio system of the first, second, third or fourth preferred embodiment described above and having substantially the same function as its counterpart is identified by the same reference numeral and description thereof will be omitted herein.

In the first and second preferred embodiments of the present invention described above, only the device 1 is provided with the impedance converting section. On the other hand, in the third and fourth preferred embodiments of the present invention described above, both the device 1 and the loudspeaker 2 (both the transmitter and the receiver) are provided with the impedance converting section. According to this fifth preferred embodiment, however, only the loudspeaker 2 is provided with the impedance converting section 22.

In the third preferred embodiment of the present invention described above, the waveform parameters of the transmitter's resonant circuit 91 are supposed to be detected by the detecting section 71 and the control section 101 are supposed to control both of the transmitter's and receiver's impedance control sections 41, 42 and the amplitude control section 81. According to this fifth preferred embodiment, however, the control section 101 are supposed to control the impedance control section 42 on the receiving end (i.e., of the loudspeaker's) and the amplitude control section 81. The transfer efficiency can be certainly increased by controlling both of the transmitter's and receiver's impedance values as described above. However, the decrease in transfer efficiency can also be minimized even by controlling only the transmitter's or receiver's impedance value.

Based on the result of detection obtained by the detecting section 71, the control section 101 controls the amplitude control section 81 and the impedance control section 42, thereby preventing the volume of the audio output through the loudspeaker 2 from changing discontinuously before and after the impedance value of the loudspeaker 2 is changed.

Embodiment 6

Figure 16:
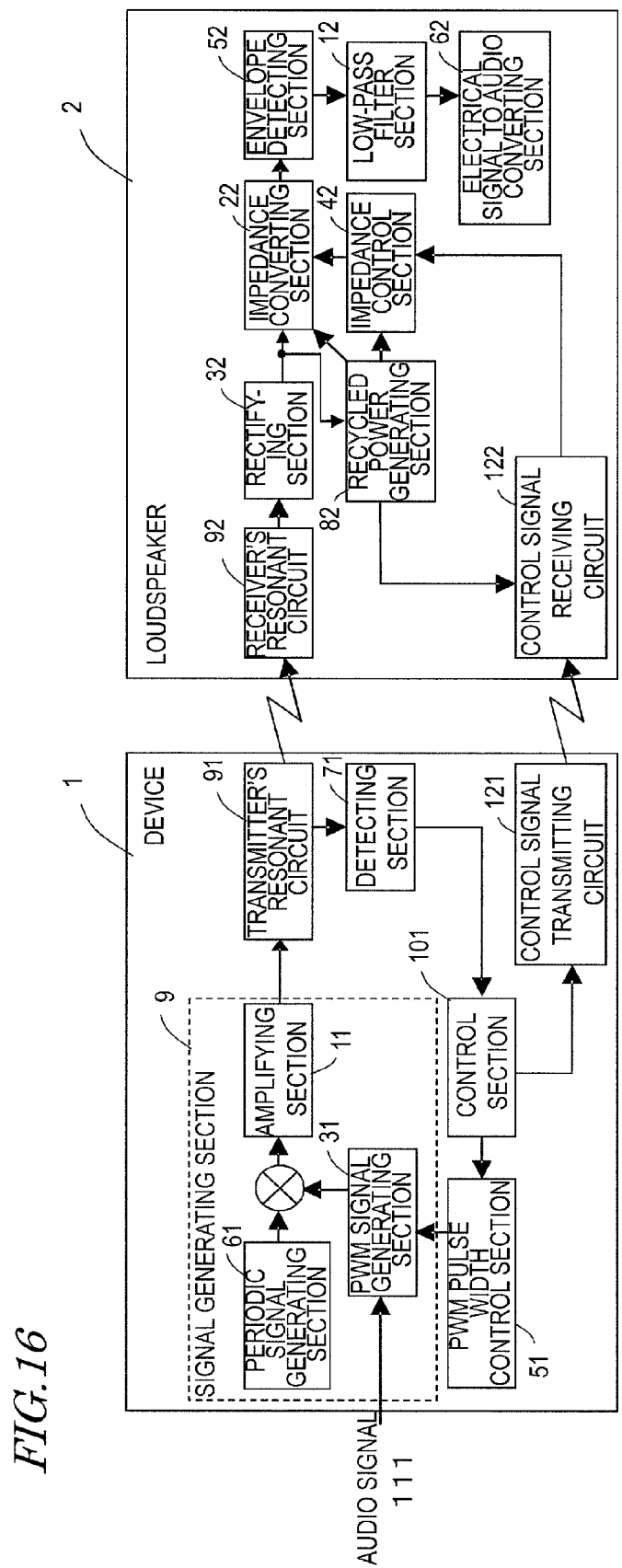
FIG. 16 illustrates a configuration for an audio system as a sixth preferred embodiment of the present invention.
Figure 17:
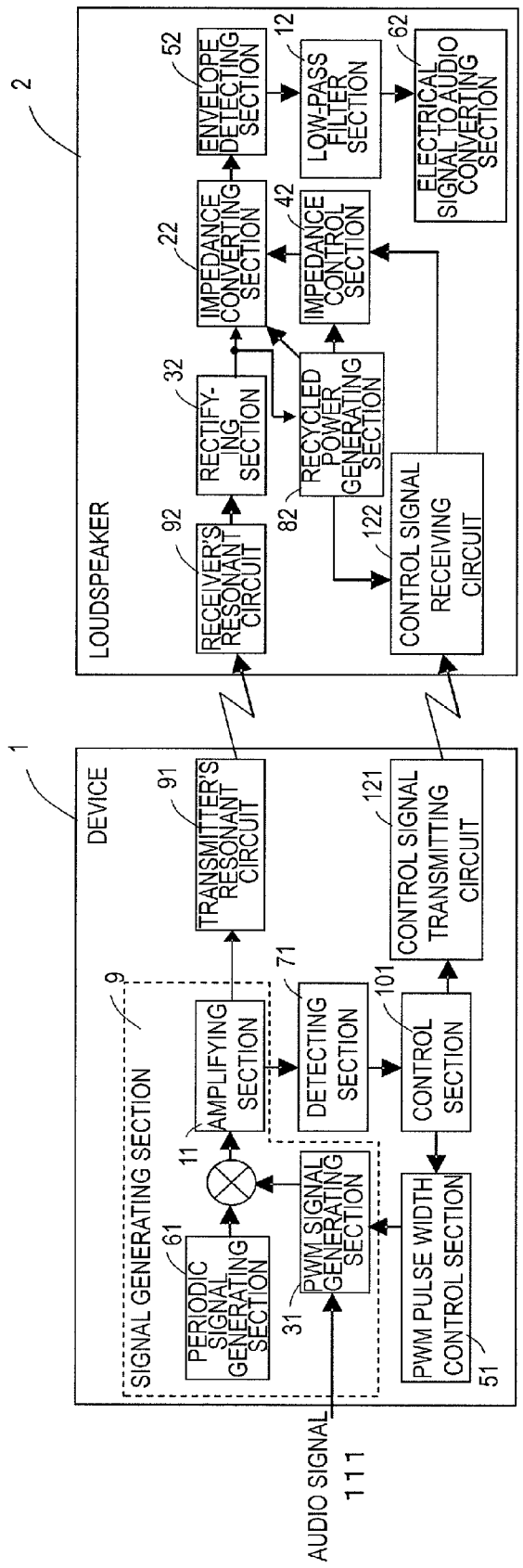
FIG. 17 illustrates a modified example of the audio system of the sixth preferred embodiment.
Figure 18:
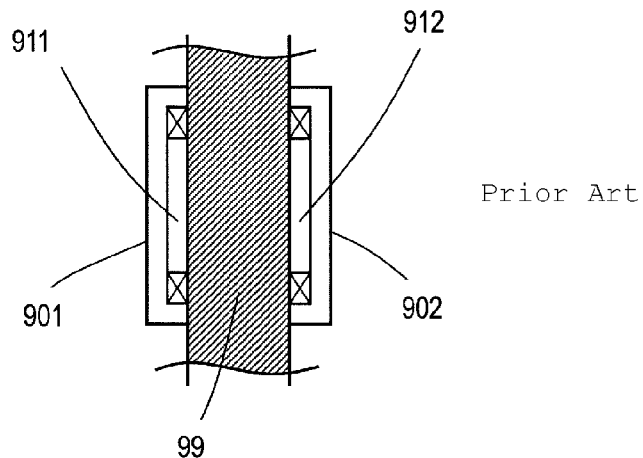
FIG. 18 illustrates a configuration for a conventional wireless power transmission system for a loudspeaker.
Figure 19A:
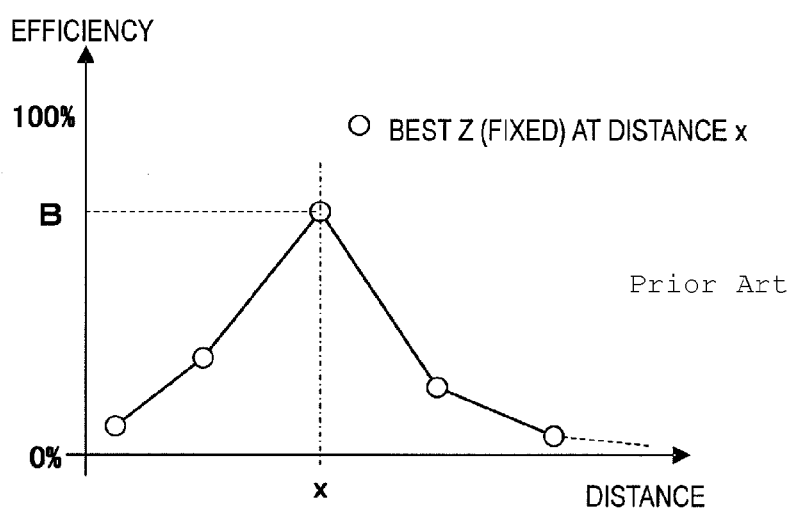
FIGS. 19A and 19B show how the transfer efficiency and the impedance value change with the distance according to a magnetic resonance method.
Figure 19B:

FIGS. 16 and 17 illustrate an exemplary arrangement of functional blocks in a wireless power transmission audio system as a sixth preferred embodiment of the present invention. In FIGS. 16 and 17, any component also included in the wireless power transmission audio system of the first, second, third, fourth or fifth preferred embodiment described above and having substantially the same function as its counterpart is identified by the same reference numeral and description thereof will be omitted herein.

In the fifth preferred embodiment of the present invention described above, the waveform parameters of the transmission signal of the transmitter's resonant circuit 91 (or the amplifying section 11) are supposed to be detected by the detecting section 71 and the amplification factor of the amplifying section 11 of the signal generating section 9 is supposed to be changed in order to prevent the volume of the output audio from changing before and after the impedance value is changed. On the other hand, according to this sixth preferred embodiment, such a change of the volume of the output audio is avoided by having the pulse width of the PWM modulated signal, which is obtained by modulating the audio signal 111, controlled at the PWM signal generating section 31. According to this sixth preferred embodiment, by controlling the receiver's (i.e., loudspeaker's) impedance value as in the fifth preferred embodiment described above and by controlling the pulse width of the PWM modulated signal as in the second and fourth preferred embodiments described above, it is possible to prevent the volume of the audio output through the loudspeaker 2 from changing discontinuously before and after the impedance value is changed on the receiving end (i.e., at the loudspeaker 2).

Although the present invention has been described by way of illustrative preferred embodiments thereof, the present invention is in no way limited to those specific preferred embodiments. An audio system according to the present invention may be implemented as not only a system with a fixed loudspeaker but also a device with a portable small loudspeaker such as an earphone or a headphone.

If the impedance is changed in order to maintain the same transfer efficiency even when the distance between the device on the transmitting end and the loudspeaker changes, the wireless power transmission audio system of the present invention changes the waveform of the transmission signal (e.g., the amplitude and pulse width of the PWM modulated pulses). In this manner, it is possible to avoid an unwanted situation where the volume changes discontinuously before and after the impedance is changed. With such an audio system, the volume of the audio output can be stabilized even when a portable loudspeaker is used. In addition, since the device on the transmitting end and the loudspeaker are connected together wirelessly, the system of the present invention can be used effectively in a surround system in which a lot of loudspeakers need to be arranged. Furthermore, the present invention can also be used effectively even when the angle of the loudspeaker should be changed, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2010-285497 filed on Dec. 22, 2010 and No. 2011-244726 filed on Nov. 8, 2011, the entire contents of which are hereby incorporated by reference.

What is claimed is:

1. A wireless power transmission audio system comprising:
   a device on a transmitting end; and
   a loudspeaker which is associated with the device on the transmitting end, the wireless power transmission audio system being configured to transmit electric power and an audio signal wirelessly from the device on the transmitting end to the loudspeaker,
   wherein the device on the transmitting end includes:
      a transmission signal generating circuit configured to generate a transmission signal which is comprised of an RF signal for use to transmit the electric power and the audio signal;
      a first resonant circuit which receives and sends out the transmission signal and a resonant frequency of the first resonant circuit is equal to a frequency of the RF signal;
      a detecting circuit configured to sense a variation in the transmission signal; and
      a transmission signal adjusting circuit configured to control a signal waveform of the transmission signal, and
   wherein the loudspeaker includes:
      a second resonant circuit, which receives at least a part of the transmission signal that has been sent out by the first resonant circuit, where the first resonant circuit and the second resonant circuit are coupled with each other by a magnetic resonant coupling phenomenon or an electric field resonant coupling phenomenon at the resonant frequency when the second resonant circuit receives the at least a part of the transmission signal; and
      an audio output circuit configured to reproduce the audio signal in accordance with a signal supplied from the second resonant circuit, and
   wherein at least one of the device on the transmitting end and the loudspeaker includes an impedance adjusting circuit which is connected to the first or second resonant circuit and which changes an impedance value on a transmission line of the transmission signal according to the variation of the transmission signal that has been sensed by the detecting circuit, and
   wherein, when the impedance adjusting circuit changes the impedance value, the transmission signal adjusting circuit changes a signal waveform of the transmission signal at the device on the transmitting end.

2. The wireless power transmission audio system of claim 1, wherein the transmission signal generating circuit includes a PWM signal generating circuit configured to generate a pulse-width-modulated audio signal, and
   wherein the transmission signal is obtained by multiplying the pulse-width-modulated audio signal and the RF signal together.

3. The wireless power transmission audio system of claim 2, wherein the transmission signal adjusting circuit includes an amplitude control circuit configured to control an amplitude of the pulse-width-modulated audio signal.

4. The wireless power transmission audio system of claim 2, wherein the transmission signal adjusting circuit includes a pulse width control circuit configured to control the pulse width of the pulse-width-modulated audio signal.

5. The wireless power transmission audio system of claim 2, wherein in a no-signal interval between pulses of the transmission signal, which is defined by the pulse-width-modulated audio signal, the impedance adjusting circuit changes the impedance value.

6. The wireless power transmission audio system of claim 2, further comprising a control circuit, which outputs a control signal to the impedance adjusting circuit and the transmission signal adjusting circuit in accordance with a signal supplied from the detecting circuit,
   wherein the control circuit includes a storage circuit, which stores relative positions that have been detected by the detecting circuit and also stores information about how transfer efficiency between the first and second resonant circuits changes with the impedance value that has been set by the impedance adjusting circuit, and
   wherein the control circuit performs a control so that a product of an amplitude of the pulse-width-modulated audio signal and a pulse width of the pulse-width-modulated signal remains the same before and after the impedance value has been changed by the impedance adjusting circuit, thereby keeping volume of the audio output through the audio output circuit unchanged.

7. The wireless power transmission audio system of claim 1, wherein the detecting circuit senses a variation to be caused in the transmission signal depending on relative positions of the first and second resonant circuits, and
   wherein in accordance with a signal supplied from the detecting circuit, the impedance adjusting circuit controls the impedance value and the transmission signal adjusting circuit controls the signal waveform of the transmission signal.

8. The wireless power transmission audio system of claim 7, wherein by sensing a variation in the signal waveform of the transmission signal at the first resonant circuit, the detecting circuit determines the relative positions of the first and second resonant circuits.

9. The wireless power transmission audio system of claim 7, wherein by sensing a variation in the signal waveform of the transmission signal at the transmission signal generating circuit, the detecting circuit determines the relative positions of the first and second resonant circuits.

10. The wireless power transmission audio system of claim 1, wherein in accordance with an output of the detecting circuit, the impedance adjusting circuit changes the impedance value discretely and the transmission signal adjusting circuit changes the signal waveform of the transmission signal stepwise.

11. The wireless power transmission audio system of claim 1, wherein the loudspeaker includes the impedance adjusting circuit, and
    wherein the device on the transmitting end further includes a control signal transmitting circuit configured to send a control signal to the loudspeaker's impedance adjusting circuit, and
    wherein the loudspeaker's impedance adjusting circuit changes the impedance value in accordance with the control signal.

12. The wireless power transmission audio system of claim 1, wherein the impedance adjusting circuit includes a first impedance adjusting circuit and a second impedance adjusting circuit, and the device on the transmitting end includes the first impedance adjusting circuit and the loudspeaker includes the second impedance adjusting circuit.

13. The wireless power transmission audio system of claim 1, wherein the loudspeaker includes:
    an envelope detecting circuit configured to detect an envelope of a signal that has been received by the second resonant circuit;
    a low-pass filter circuit configured to retrieve the audio signal based on an output of the envelope detecting circuit; and an audio converting circuit configured to reproduce audio based on an output of the low-pass filter circuit.

14. The wireless power transmission audio system of claim 1, wherein, after the transmission signal adjusting circuit has changed the signal waveform of the transmission signal, the first resonant circuit receives the transmission signal.

* * * * *